United States Patent [19]

Baer et al.

[11] 4,357,014
[45] Nov. 2, 1982

[54] INTERACTIVE GAME AND CONTROL THEREFOR

[75] Inventors: Ralph H. Baer, Manchester; Leonard D. Cope, Merrimack; Oliver D. Holt, Amherst, all of N.H.; Howard J. Morrison, Deerfield, Ill.

[73] Assignees: Sanders Associates, Inc., Nashua, N.H.; Marvin Glass & Associates, Chicago, Ill.

[21] Appl. No.: 146,832

[22] Filed: May 5, 1980

Related U.S. Application Data

[63] Continuation-in-part of Ser. No. 770,735, Feb. 22, 1977, abandoned.

[51] Int. Cl.³ .................................................. A63F 9/22
[52] U.S. Cl. ................................... 273/85 G; 273/94; 273/DIG. 28
[58] Field of Search .............. 273/DIG. 28, 85 G, 88, 273/94, 313–315; 340/723–726; 358/98, 104, 183

[56] References Cited

U.S. PATENT DOCUMENTS

| | | | |
|---|---|---|---|
| 3,659,285 | 4/1972 | Baer et al. | 273/85 G |
| 3,777,410 | 12/1973 | Robinson | 273/DIG. 28 |
| 3,821,468 | 6/1974 | Busch | 358/183 |
| 3,868,112 | 2/1975 | Avera | 273/94 |
| 3,874,669 | 4/1975 | Ariano et al. | 273/85 G |
| 3,879,722 | 4/1975 | Knowlton | 340/365 R |
| 3,895,798 | 7/1975 | Collins | 273/94 |
| 4,026,555 | 5/1977 | Kirschner et al. | 273/85 G |
| 4,045,789 | 8/1977 | Bristow | 273/DIG. 28 |
| 4,093,223 | 6/1978 | Wilke | 273/94 R |
| 4,104,625 | 8/1978 | Bristow et al. | 273/DIG. 28 |
| 4,126,851 | 11/1978 | Okor | 273/237 |
| 4,156,928 | 5/1979 | Inose et al. | 273/237 X |
| 4,249,735 | 2/1981 | Bromley | 273/85 G |

*Primary Examiner*—Vance Y. Hum
*Attorney, Agent, or Firm*—Louis Etlinger; Richard I. Seligman

[57] ABSTRACT

An interactive game of a strategy nature employing a digital processor includes a keyboard to preselect the successive directional movements of one or more of the simulated player symbols prior to the start of the game and/or supplement this preprogrammed game action with real-time control over further game action during the playing of the game.

9 Claims, 9 Drawing Figures

INTERACTIVE GAME AND CONTROL THEREFOR

This application is a continuation-in-part of our application Ser. No. 770,735, filed Feb. 22, 1977, now abandoned.

BACKGROUND OF THE INVENTION

Game playing devices which generate signals for symbols to be displayed on the screen of a television receiver employing microprocessors responsive to both player/participant's commands and plug-in ROM cartridge game rules, symbology-storage, etc. are well-known in the art. In general, such devices provide games in which the motion of the player symbols is either directly controlled by the participants during game play or is preselected by the participants prior to the start of the actual game by selecting a particular play to be run, thus providing a variety of player symbol movements, such as the motions of simulated football players in accordance with a game strategy contained within the ROM program and selectively chosen by the human participant. In the latter case of participant play selection, there is a relatively small number of plays which can be selected, and, thus, there is a limit to the degree of strategy which can be employed by the participants.

Accordingly, it is an object of this invention to extend the scope of video type game playing apparatus for games of a strategy nature.

It is another object of this invention to add flexibility to video game and educational and training apparatus by permitting the user to program the apparatus during use thereof with varied and distinct programs to predetermine a series of directional moves of a multiplicity of player symbols to be executed automatically after game start.

SUMMARY OF THE INVENTION

Briefly, by way of an example, in a digital processor controlled, interactive video game, such as a simulated football game, player symbols representing the "team members" are shown on the screen of a television receiver or cathode ray tube monitor and are caused to move through a series of preprogrammed moves. Each of the individual "team-member" symbols shown on the screen first appear in a preprogrammed formation, such as a defensive or offensive grouping of the various player symbols. A mechanical entry device such as a keyboard displaying directional arrows is then used by the human participant to program each one of, for example, five sequential directional moves of a particular player symbol, for example, the quarterback. This preprogramming may typically, be a straight movement backwards, a diagonal movement downward and rearward, followed by three forward movements; each of the movements are known to take, e.g., five seconds of elapsed time. Having completed the preprogramming of the quarterback's desired movements on-screen, the human participant next preprograms a similar sequence of keystroke entries for a predetermined number of the remaining programmable player symbols. Each symbol awaiting programming is caused to blink to indicate its readiness to accept program commands. Both teams are programmed in similar manner by the human participants.

When both participants have programmed all of their "team members", and the players are ready for competitive game action, the processor is instructed to cause the desired symbol movements to be executed on the television screen. Thus, this invention is seen to be clearly different from previously-known systems in which machine-predetermined movement sequences only can be selected.

The invention further includes the complementary use of hand controls such as joysticks colocated with each of the direction command entry keyboards to allow shifting the location of one's entire "team" on-screen in a vertical, up-and-down, or left and right direction or, alternatively, through joystick control to add to or subtract from, movements to speed up or slow down players in any desired direction. This latter feature allows the participant to superimpose such corrective manual positioning control commands on those resulting from the participant programmed processor machine-commands as the real-time situation during the course of actual game play may appear to require.

Another feature of the invention is the use of the same directional-command manual controls or keyboards to initiate the motion of a symbol representing, say, a football being thrown by the quarterback, such that the ball's flight will be in the direction of the arrow associated with the key depressed by the human participant. Thus, the keystroke will determine both the instant of launching the ball as well as its direction of flight. Thereafter joystick control will not affect the predetermined path of the "ball" but the players will still be controllable to guide a receiver into the path of the "ball" to make a completed pass.

BRIEF DESCRIPTION OF THE DRAWINGS

The above-mentioned and other features and objects of this invention will become more apparent by reference to the following description taken in conjunction with the accompanying drawings, in which.

DESCRIPTION OF A PREFERRED EMBODIMENT

Figure 1:
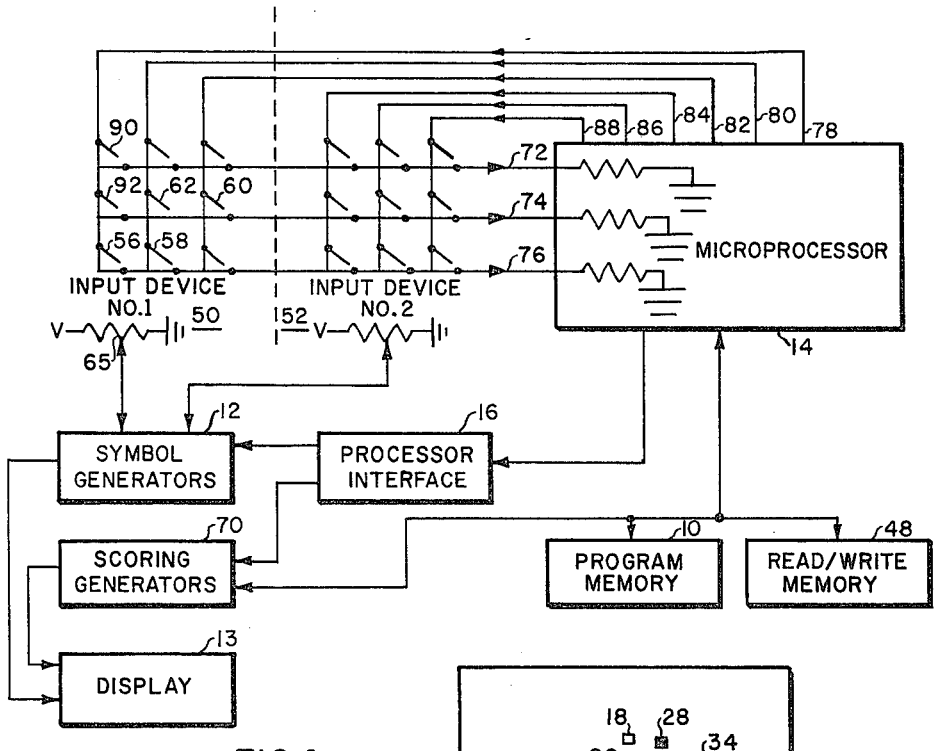
FIG. 1 is a drawing in block and schematic form illustrating a preferred embodiment of the invention.

Referring now to the drawings, there is illustrated thereby one embodiment of the invention. This embodiment will be described in conjunction with a simulated football game, however, the principles of the invention may be employed for many different types of games or other activities. In the football game described herein a program is stored in a program memory 10. The program memory in this embodiment is a read-only memory (ROM). A typical computer program is set forth in program listings A-D set forth herein.

This program is set forth in assembly code and to enter it into the microprocesor (in this embodiment a Motorola MC 6800) a cross assembler is employed to convert from the assembly language to the machine language code. It is not necessary to describe this program in detail since along with the mnemonics describing the operand and data fields there are various comments to the program user indicating the function of the program instructions.

For a typical football game to be played using the present invention the program memory 10 is programmed with "the rules of football". These rules, of course, are modified and simplified so that only certain of them as necessary for the playing of the particular game are stored, i.e., the rules are a designer's compromise choice between potential product-price and play values. The program memory can be a ROM located in the game unit or ROM located in a cartridge insertible into the game unit such that a variety of games may be played by merely changing the plug-in cartridge.

Another item to be stored in program memory 10 is the starting position of the players which might represent a huddle followed by a formation such as is done on current video football games. The players are generated by symbol generators 12 which provide symbology representing the players on the screen of a cathode ray tube display 13. The players are represented, for example, as squares or rectangles or other geometric figures which will generally, be animated. Alternatively, the symbol generators can, as is well known in the art, employ read-only memories which would be programmed to display symbology on display 13 which would be configured more like real life players.

Figure 3:
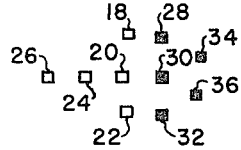
FIGS. 3-5 are sketches illustrating a typical operation of the embodiment of FIG. 1.

Initially, in the present example, program memory 10 is read out through a microprocessor 14 and the output thereof applied through a processor interface 16 to display the players in an initial starting position. This is illustrated in FIG. 3 of the drawings wherein five players are illustrated for each team, although any number of players is possible. For example, in a football game each team may include eleven players to enhance reality. The offensive team is represented by the white players and the defensive team by the black players. The offensive players 18, 20 and 22 form the offensive line. Player 24 represents a quarterback and player 26 represents a running back. The defensive players shown in black are players 28, 30 and 32 constituting the defensive line and two defensive backs 34 and 36. These players are initially displayed in the position shown at the start of a game.

Figure 4:
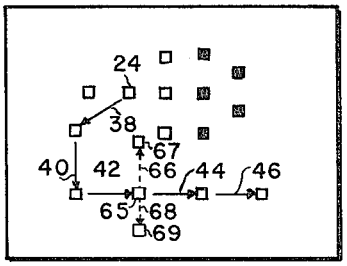

One of the primary features of this invention is to provide additional human-player-participant originated programming, i.e., programming other than that stored in program memory 10. This will allow the participants to program one or more of the players shown in FIG. 3 to execute a predetermined set of directional moves during game play. This is illustrated in FIG. 4 of the drawings wherein the quarterback 24 is programmed to execute the moves represented by arrows 38, 40 42, 44 and 46. That is, a program is entered into a read/write memory 48 of FIG. 1 from an input device 50 to have the player, in this instance quarterback 24, execute a participant-selected set of moves when play of the game begins. In FIG. 4 the programmed moves are shown as having quarterback 24 move diagonally to the left along the path 38 then straight down along the path 40 and then to the right along paths 42, 44 and 46. In a particular game only one or two of the players on each side might be so programmed or all of the players may be individually programmed. Unprogrammed players may be programmed permanently through the memory 10, for example, to execute the same moves each play irrespective of how the other players are programmed specifically for each new play. Again, such a design choice is a price vs. performance trade-off open to the designer and his estimate of the play-value of various features.

In one embodiment of the game, microprocessor 14, through the program stored in program memory 10, causes each of the ten displayed players to exhibit certain programmed behavior before playing of the game actually begins. One way of doing this is to have, for example, one of the five offensive players blink such that the participant will know that this is the player which should be programmed for subsequent directional moves. For example, quarterback 24 will blink whereupon the participant will program this player for, for example, five distinct moves as illustrated in FIG. 4. When the five distinct moves are entered into read/write memory 48 via the processor 14, then another of the offensive players will be caused to blink and the participant can then program that player for five moves of his choosing.

At the same time the participant representing the defense will also be allowed to program each of his players to execute predetermined directional moves in the same fashion as the offensive player. Again each of the defensive players represented by the black squares will blink in succession whereupon the participant representing the defense will program that player symbol's directional moves. When the five moves are entered for this player symbol, the latter will cease blinking and another player will start to blink and it will be programmed.

Figure 2:
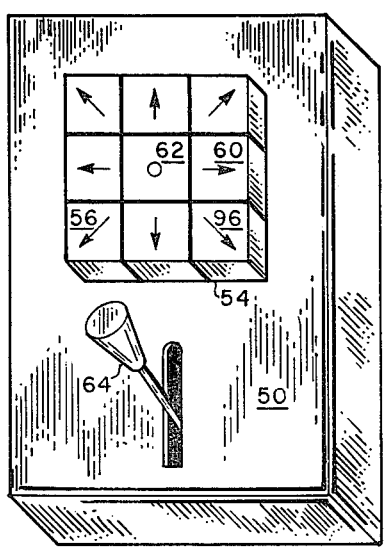
FIG. 2 is a perspective diagram of an input device employed in the embodiment of FIG. 1.

The programming of the players is carried out using input devices 50 and 52 which are schematically illustrated in FIG. 1 and pictorially illustrated by input device 50 of FIG. 2.

When all the available player symbols have been programmed, and play action commences, microprocessor 14 outputs the required control data to symbol positioning inputs of the symbol generators 12, thus, causing the symbol generators to produce movements of the CRT-displayed symbols in the preprogrammed paths.

Referring to FIG. 2, it is seen that input device 50 comprises a keyboard 54 having nine keys thereon. The programming of directional moves to be executed by a player symbol is accomplished by successively pushing one of the nine keys. For example, to carry out the program of quarterback 24 as illustrated in FIG. 4, the participant first pushes the key 56 to program the move 38. The participant then pushes the key 58 to program the move 40 and finally pushes the key 60 three times to program the moves 42, 44 and 46. In like fashion the other players are programmed in the same manner by depressing the keys having vectors thereon indicating the moves which the players are to execute when play begins. Note that keyboard 54 also includes a key indicated by a zero thereon rather than a vector. This key is used by the participant when it is desired that at that particular portion of the play the player being programmed will not move but stand still and hold his position for a period of time. Thus, the five program steps might be: go up, go left, stand still, stand still, go right.

While the present embodiment only requires that microprocessor 14 query the status of the keys, it is well within the scope of the invention to query how long a key has been depressed. Such a feature is particularly useful in other games where it may be desired to pitch a ball fast or slow or hit a ball a long distance or a short distance. It is also obvious that the 4 typical contacts in a standard video game joystick can be used as directional move command keys in a manner identical to the keyboard heretofore described. For example, moving the joystick to the southwest position is the same as depressing key 56 of FIG. 2.

The input device 50 contains, in addition to the keyboard 54, a joystick 64, connected to a potentiometer 65, which in this embodiment can be moved up or down, however, alternatively, it could be made to move in any direction. Joystick 64 is used by the participant during the playing of the game, that is, while the players are executing their moves. It is employed to move the entire team, either the offense or the defense, up or down on the screen. This is also indicated in FIG. 4, however, again, only for the quarterback. After the move 42 has been executed by the quarterback such that the player will be in position 65, the joystick 64 can be moved upward which will cause the quarterback to move along vector 66 to a new position 67. The joystick can be used only to move the quarterback or whoever has the ball in this fashion or can be so programmed such that the entire team will move in a desired distance, as in this embodiment. In like fashion, moving the joystick 64 down will cause the quarterback to execute a vector 68 to a new position 69 and will likewise cause all the rest of the players on the offensive team to move in that direction and a distance represented by vector 68 to new positions on the screen of the display 13. Two axis joystick control may also be used so as to give the human participant still more interactive capability. In this case, a small amount of horizontal movement of the associated team will be possible.

Multiple joysticks may be provided so that certain player symbols on one team can be moved independently. This is particularly desirable in that it creates a game playable by more than two human participants.

Program memory 10 in addition to containing the "rules of football" by which the game is carried out is also programmed so as to provide via scoring generators 70 an output to display 13 indicating what has happened after a play has been completed, that is, whether a touchdown has been scored or what down it is, how many yards for a first down, and the like.

The input device 50 is illustrated in schematic form in FIG. 1 where it is shown that each of the buttons are in fact switches. The state of these switches is communicated to the microprocessor 14 via lines 72, 74 and 76 when the microprocessor queries the state of these switches via lines 78, 80, 82, 84, 86 and 88 through a strobing process. For example, microprocessor 14 will cause line 78 to apply a pulse to the switches 90, 92 and 56 and the state of these switches will be indicated by signals returned to microprocessor 14 via lines 72, 74 and 76. If a signal is received on, for example, line 76 after applying a signal along line 78, then the microprocessor is apprised that in fact switch 56 has been closed.

Figure 5:
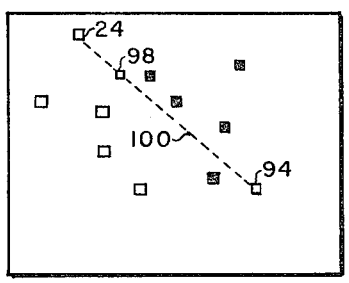

The keyboard 54 used by the participant representing the offensive team for preprogramming the directional moves of the player symbols has an additional purpose (function) in the present embodiment of a simulated football game. It is used to allow the quarterback 24 to throw a pass to another player. This is illustrated in FIG. 5 wherein the players are shown in new positions on the screen of the display after having executed some of the moves programmed previously, If the participant believes that the quarterback is in a position such that it is desirable to throw a pass to a receiver 94, he executes this through the keyboard 54 by depressing one of the vector keys. In the illustrated example, the participant, by pressing a key 96, causes a ball 98 to move in the direction of the vector on that key, namely, in the direction represented by line 100 in FIG. 5. The ball, as shown, will proceed along the direction 100 until it is received by player 94. In the event one of the defensive players is positioned along line 100 between quarterback 24 and the receiver 94, then the ball will be intercepted. The input device can also be used to simulate on the screen, kickoffs, kicking of field goals, and the like.

While input device 50 has been illustrated as comprising a plurality of keys, other implementations may be employed which will provide a similar function. Exemplary, but not totally inclusive of these is the use of a joystick connected to a multiple contact switch as is well known or a combination rotary and pushbutton switch. Such a switch would include a knob with a directional arrow thereon. The knob would be turned so that the directional arrow is pointing in the selected direction and the information conveyed thereby inputted to the microprocessor by pushing the knob.

Figure 6A:
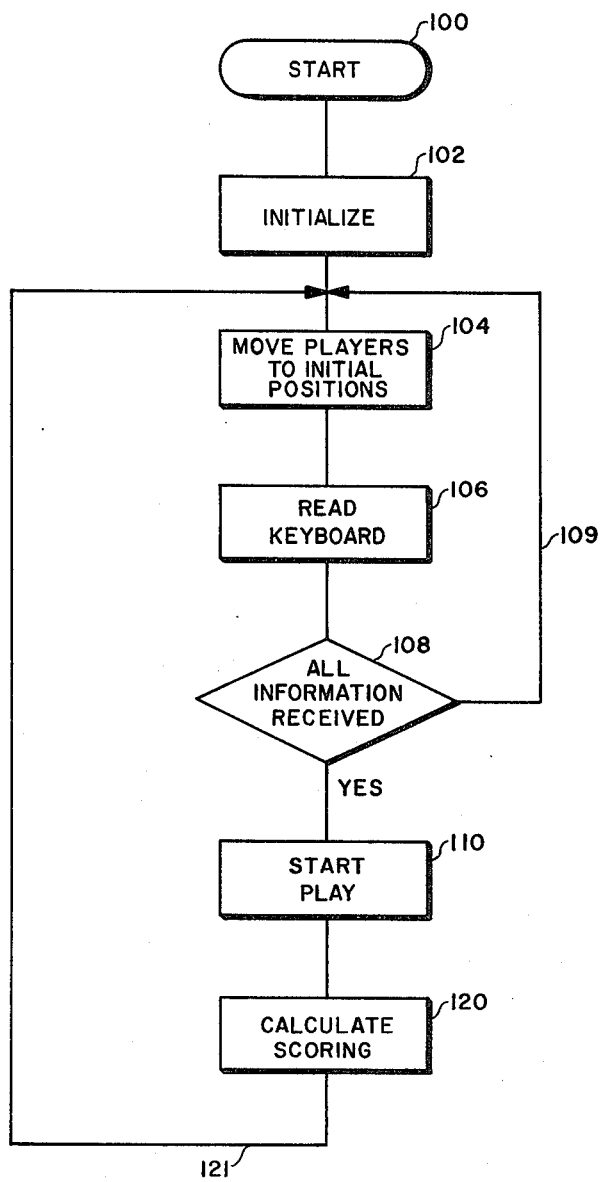
FIGS. 6A-6C are flow charts of a controlling program for the embodiment of FIG. 1.

Referring now to FIG. 6A there is illustrated thereby a simplified flow chart of a typical controlling program for the system of FIG. 1. This program is stored in the ROM of microprocessor 14, namely, program memory 10. In a typical football-type game playable with the system previously described, the steps 100, 102 of the controlling program starts the game by occasioning a resetting of the program memory 10 and initializing the read-write memory 48. The initial positions that the players are to assume on screen are typical of the information with which read-write memory 48 is initialized. These steps are common to most currently available Video Football Games.

Step 104 of the controlling program occasions microprocessor 14 to move the players to their starting positions as defined by the program stored in the program memory 10 and as indicated by typical positions shown in FIG. 3 of the drawings. Step 106 of the controlling program is the basic action fundamental to the present invention. This step calls for the preselection of a directional move (vector, path) of one of the player symbols. The participant enters such player move in read/write memory 48 by means of the input devices 50 or 52 as previously described. Microprocessor 14 strobes the keyboards 54 of the input devices 50 and 52 and enters the information therefrom into the memory 48. Program step 108 occasions the microprocessor to determine if all the information has been entered by the keyboard; if not, then the controlling program reverts back to step 104 as indicated by a line 109.

The detailed instruction to the computer 14 relating to the preprogramming aspect of the game is stored in program memory 10 as shown in the program listing B, set forth hereinafter, "Table Making Subroutine", line items 00100 through 10700 and program listing C set forth hereinafter, "Keyboard Read Subroutine", line items 00100 through 21100.

If there is more than one human participant, then two input devices 50 and 52 are used simultaneously to enter each participant's preselected directional moves; microprocessor 14 would, of course, know which keyboard was being activated at any one moment and stores the two different sets of preselected moves appropriately.

Figure 6B:
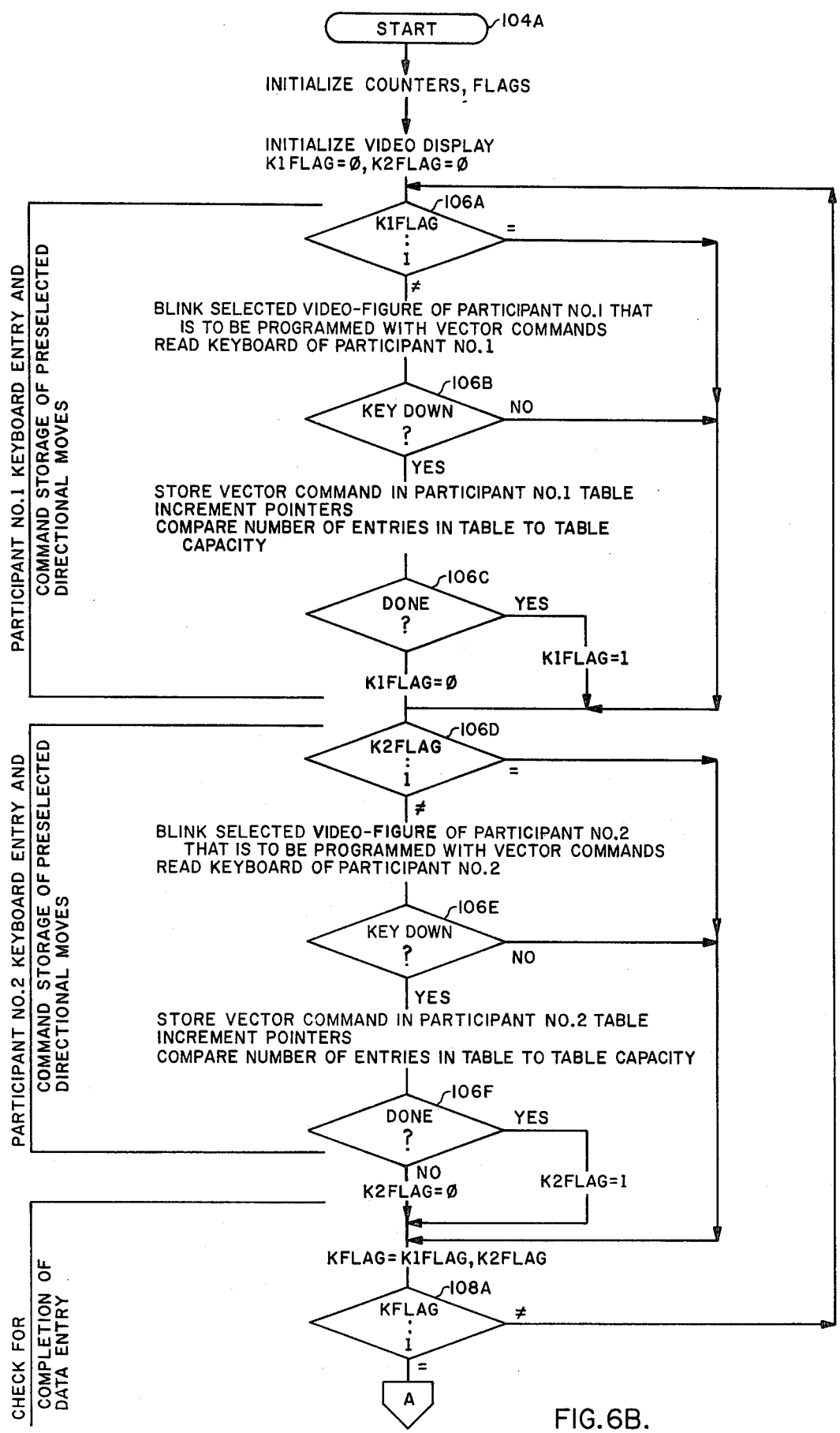

A more detailed flow chart of steps 104, 106 and 108 of FIG. 6A is shown in FIG. 6B, which represents the essence of the present invention.

Referring to FIG. 6B, it is seen that the typical pregame data entry phase during which the preselection of directional movements takes place, occurs prior to game realtime execution; two participants activate their keyboards or joysticks as shown. A particular implementation of a given microprocessor controlled TV football game might be programmed to receive five preselected consecutive motion-direction commands for each player shown on screen.

Steps 106A through 106C indicate the data entry and subsequent data manipulation of preselected directional movements associated with the first of two participants in the game.

Steps 106D through 106F indicate the data entry and subsequent data manipulation associated with the second of two particpants in the game. The microprocessor alternately "looks" at the two keyboards to determine if commands have been entered by the participants.

Finally, referring to steps 108A of FIG. 6B, the completeness of the data entered in the previous steps is checked; if data is incomplete, the respective keyboard service routines are repeated until Step 108A verifies completeness of data.

In the program listing B, steps 106A through 106C are found between lines 02800 and 05600; while steps 106D through 106F are found between lines 05700 and 08700.

Figure 6C:
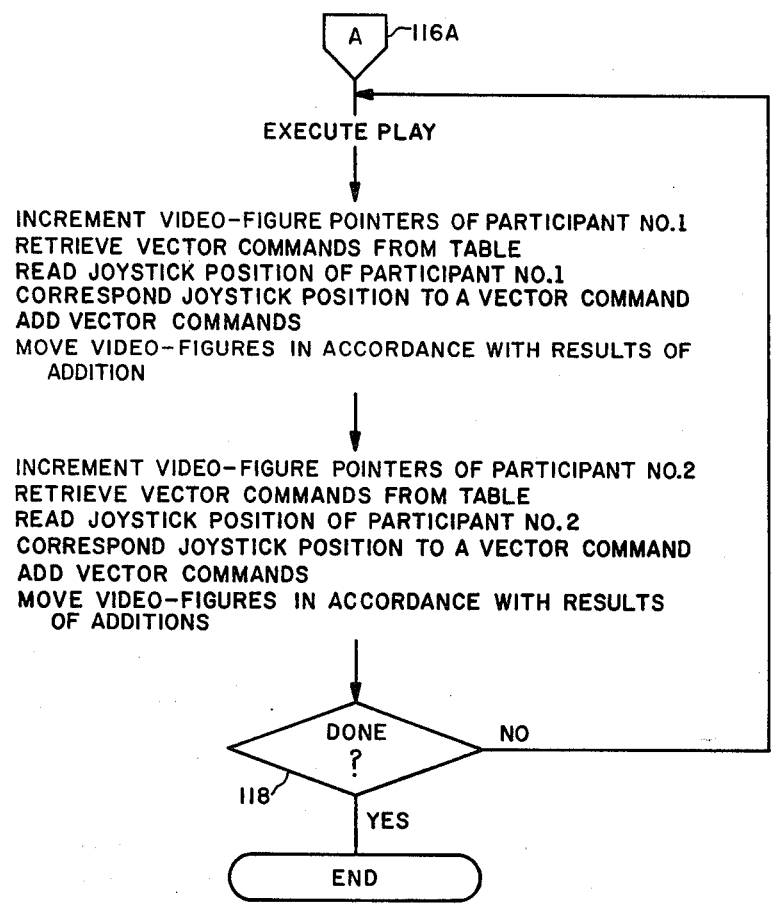

Returning again to FIG. 6A, once the microprocessor has determined that all the players symbols have been assigned preselected directional movement commands, five such commands per player symbol in the present example, via the input devices 50, 52, the microprocessor instructs play to begin as shown in step 110 of FIG. 6A, and steps 116A of FIG. 6C. That is, the microprocessor looks to see if all fifty commands have been keyed in by the input devices 50 and 52. When they have, as indicated by step 108 and 116A, of the controlling program, play begins and the players begin to execute the moves in the manner preselected via the input devices 50 and 52. Alternatively, the input devices can include a switch for the offensive team to "hike" the ball, causing play to begin.

The precise manner in which the players are moved in accordance with participants preselection of directional movement commands is shown in FIG. 6C. The commands are represented by subroutines lines 48000 through 50800 of the program listing A. It is to be noted that these instructions are strictly related to the detailed hardware implementation of the player symbol generators and would vary from one design to another. When the play has ended, as indicated by step 118 of FIG. 6C, then step 120 of the program in FIG. 6A is executed to cause a calculation to be made as to whether a score has occurred, or whether a number of yards has been gained, what down it is, and so forth. This information is displayed on display 13 via scoring generators 70. Similar scoring functions are found in many current video football games and are not part of this invention.

As indicated by line 121 of FIG. 6A, the play of the game then reverts to step 104 whereby the players are moved to their starting position and memory 48 is readied to be programmed by input devices 50, 52 for the next play. Note that at the completion of a play, control reverts back to the main routine which controls this particular game system shown in program listing A, lines 05500 to 09300.

The detail subroutines typical of the implementation used in the video football game built with the teachings of this invention, are the "HIKE", "PASS" & "RUN" subroutines shown in program listing A, starting with lines 51200, 60900 and 7220, respectively.

Figure 7:
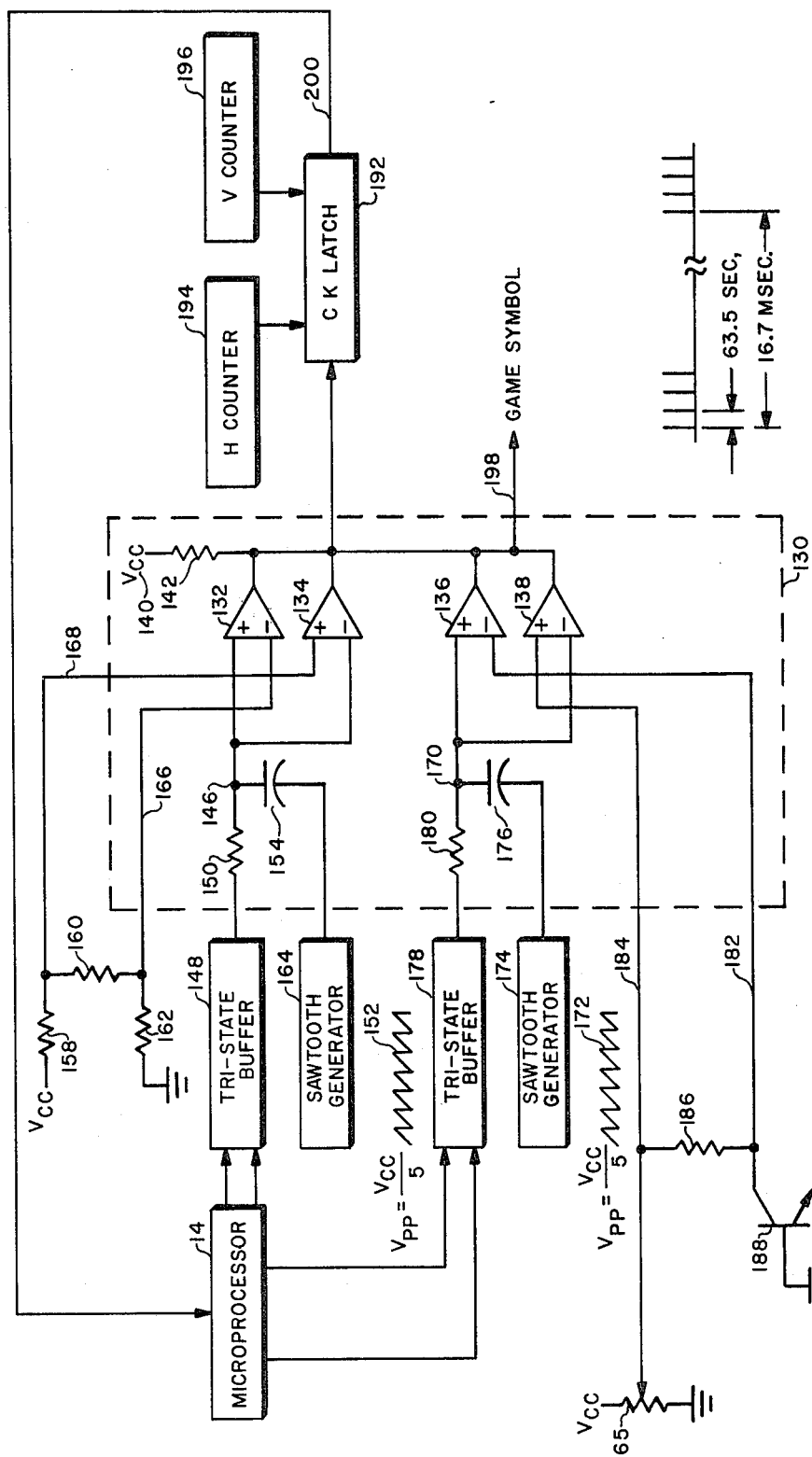
FIG. 7 is a block diagram of one embodiment of a symbol generator employed in the embodiment of FIG. 1.

Referring now to FIG. 7 of the drawings, there is illustrated thereby a typical symbol generator and means for providing control signals thereto to cause movement of the symbols, such control being provided from microprocessor 14 and potentiometer 65. The player symbol is generated by a symbol generator shown within the dotted lines 130. Symbol generators 12 comprise a number of these. Symbol generator 130 is so configured as to allow for simultaneous control from multiple sources of movement commands, as for example, microprocessor 14 and potentiometer 65.

In this embodiment symbol generator 130 comprises four voltage comparators 132, 134, 136 and 138 tied to a voltage source 21 via a resistor 23. Each of these comparators has a plus and minus input and is configured such that when the plus input is greater than the minus input, the comparator output will be in a high state and when the minus input is greater than the plus input, the comparator will be in a low state. The output of the comparator functionally looks like a switch such that when the comparator is high the switch is effectively open, and when the comparator is low the switch is effectively shorted to ground. Thus, if all four of the comparators 132, 134, 136 and 138 are in the high state a game symbol is derived at an output 144, however, when any one of the comparators is in the low state there is no output at 144.

Comparators 132 and 134 provide the horizontal portion of the game symbol and comparators 136 and 138 provide the vertical portion thereof.

The plus input to comparator 132 is the signal at a node 146. Node 146 has two inputs; one input is received from microprocessor 14 via a tri-state buffer 148, constituting a portion of processor interface 16, and a resistor 150. The second input is a sawtooth waveform 152, having a period equal to 63.5 microseconds, the horizontal sweep rate for United States television systems, which is applied to node 146 via a capacitor 154. Sawtooth signal 152 is generated in phase with the horizontal sweep circuits of the raster scan display 13. The minus input at node 146 is a d.c. reference voltage taken from a voltage divider comprising resistors 158, 160 and 162.

Tri-state buffer 148 is conventional and configured to output either a high voltage state, a low voltage state or an open circuit state.

Comparator 132 compares the voltage at the plus input thereto, which is the output from sawtooth source 164 offset by the d.c. voltage from tri-state buffer 148, with the voltage at the minus input, the reference voltage from a line 166 connected to the voltage divider comprising resistors 158, 160 and 162.

Comparator 134 is configured similar to comparator 132, however, its minus input is instead coupled to node 146, and comprises the sawtooth from source 164 offset by the output of tri-state buffer 148. The plus input to comparator 124 is a reference voltage from the voltage divider comprising resistors 158, 160 and 162 and is applied via a line 168. The d.c. reference input to the plus input of comparator 134 is a higher voltage than the d.c. reference input to the minus input of comparator 132.

When the voltage at node 146, comprising the sawtooth 152 offset by the d.c. output from tri-state buffer 148, exceeds the reference voltage applied at the minus input via line 166, comparator 132 will be in its high state and therefore in an open condition. Also, when voltage at node 146 exceeds the reference voltage applied to the plus input of comparator 134 via line 168 that comparator will go from a high to a low state. Thus, the horizontal portion of the game symbol is generated at a position on the screen corresponding to the time that comparator 132 goes high and the width of the symbol is proportional to the time lapse between comparator 132 going high and comparator 134 going low. The crossover point when the sawtooth ramp voltage equals the reference voltage on line 166 is adjusted by varying the d.c. offset at node 146. Microprocessor 14 can thus adjust the horizontal position of the game symbol in this manner.

In other words the function of comparator 132 is to sense and designate the point when to start writing the game symbol on the display. Comparator 134 establishes a fixed delay beyond such point to designate the end of a game symbol. Thus, some other circuit may be used instead of comparator 134, as for example, a monostable multivibrator.

Thus, the microprocessor 14 positions symbols on the screen of the display by adjusting the d.c. bias (or d.c. offset) voltage at the inputs to the comparators. The output of tri-state buffer 148 acts to either: (1) remove some charge from capacitor 150, or (2) apply additional charge to capacitor 150, or (3) leave conditions as they exist. The effect of this is to cause the game symbol to move with three different velocities due to the charge on capacitor 150.

Comparator 136 of the vertical portion of symbol generator 130 receives an input at its plus input from a node 170 comprising a signal 172 from a sawtooth source 174 which signal has a period equal to 16.7 milliseconds, the vertical sweep rate for U.S. television systems. This signal is applied to node 170 via a capacitor 176. Signal from a source 174 is offset by a d.c. level from a tri-state buffer 178 configured like tri-state buffer 148. The output of tri-state buffer 178 is applied to node 170 via a resistor 180. The minus input to comparator 136 is a reference voltage applied via a line 182.

Comparator 138, the other comparator constituting the vertical portion of symbol generator 130, receives as its minus input the voltage at node 170, namely, the sawtooth 172 offset by the output from tri-state buffer 178, while the plus input receives a reference voltage via a line 184.

The reference voltages for comparators 136 and 138 differ from the reference voltages for comparators 132 and 134 in that they are not fixed voltages but rather variable voltages. These voltages at lines 182, and 184 are taken from opposite terminals of a resistor 186 in the collector circuit of a transistor 188 with the collector voltage supply for transistor 188 being applied via potentiometer 65 operated by joystick 64 of FIG. 2. the voltage on line 182, of course, is always less than the voltage on line 184. The reference voltages for comparators 136 and 138 are thus made to track potentiometer 65. The current through resistor 186 is set constant by the current source comprising transistor 188 and a resistor 190.

Tri-state buffers 148 and 178 are typically integrated circuits, type no. CD4051BE made by RCA while the comparators 132, 134, 136 and 138 are typically integrated circuits, type no. MC 3302P made by Motorola.

Comparator 138 which establishes the end of character can be replaced by some delay circuit such as a monostable multivibrator as in the case of comparator 134, discussed above.

It is thus seen that this configuration of a symbol generator for generating a game symbol allows for simultaneous control from two sources of movement commands. In the present embodiment the vertical movement commands are derived from two sources: keyboards 50 via microprocessor 14 and joystick 64. The horizontal movement commands are derived only from keyboards 50 via microprocessor 14.

In addition to the feature of allowing simultaneous control from two sources of movement commands, another feature of the symbol generators is that the system generates correction signals to a game symbol to cause it to appear at a predetermined position. This feature employs a latch circuit 192 having an input thereto from a horizontal counter 194 and a vertical counter 196. The horizontal and vertical counters are initiated by the horizontal and synchronization signals of the video system not shown herein for purposes of simplification and clarity. When a symbol is generated at output 198, that is, when comparators 132, 134, 136 and 138 are all in the high or open states, a signal is applied via a line 200 to the latch circuit 192 which stores the cartesian coordinates of the symbol, namely, the horizontal and vertical counts from horizontal and vertical counters 194 and 196. These cartesian coordinates are applied via a line 200 to the input to microprocessor 14 which then "knows" where the symbol is on the display screen. The microprocessor then can be programmed to generate correction signals to move the game symbol from the known position to a new position.

While the invention has been described in conjunction with a particular video football game, it is not limited thereto and many different games such as baseball, hockey, soccer, polo, etc., may be employed using the principles of the invention.

Also, the invention has been described in relationship to a game to be played in conjunction with a television receiver. However, the use of a television receiver to display the preprogrammed moves is exemplary only as a convenient display. The principles of the invention of preprogramming moves for subsequent display during game play are applicable to any convenient display such as LED, LCD or other two dimensional graphic displays currently being used in hand-held electronic games. Thus it is to be understood that the embodiments shown are illustrative only, and that many variations and modifications may be made without departing from the principles of the invention herein disclosed and defined by the appended claims.

Program Listing ~~APPENDIX~~ A

```
00400   *       I/O PORT DEFINITION AND ADDRESS
00500   *
00600   PORT1   EQU   $08       KEY COLUMN CONTROL BITS   (OUTPUTS)
00700   *                       BITS 0-2 LEFT KEYBOARD
00800   *                       BITS 3-5 RIGHT KEYBOARD
00900   CONTR1  EQU   $09       CONTROL FOR PORT 1
01000   *
01100   PORT2   EQU   $0A       KEYBOARD ROW INPUTS BITS 0-2
01200   *                       BITS 4-7 COINICIDENCE SELECT BITS
                                OUTPUTS
01300   CONTR2  EQU   $0B       CONTROL FOR PORT 2
01400   *
01500   PORT3   EQU   $10       BALL CARRIER OUTPUT PORT BITS 0-3
01600   *                       BIT 0=LSB
01700   *                       BIT 4 CONTROLS DISPLAY LOW=ENABLE
01800   *                       BIT 5 PLAYER COLOR CONTROL  0=WHITE
                                OFFENSE, 1=BLACK OFFENSE
01900   *                       BIT 6 SRINE CONTROL  0=DISABLE
                                1=ENABLE
02000   *                       BIT 7 WHISTLE CONTROL  0=DISABLE,
                                1=ENABLE
02100   CONTR3  EQU   $11       CONTROL FOR PORT 3 AND COINICIDENCE
                                FLAG INPUT (BIT 7)
02200   *
02300   PORT4   EQU   $12       BIT 0  NOT USED
02400   *                       BIT 1 COLOR CONTROL   1=BLACK,
                                0=WHITE
02500   *                       BIT 2 COINICIDENCE RESET
                                RESET=HIGH
02600   *                       BIT 3 PASS/BALL ENABLE  ENABLE=LOW
02700   *                       BIT 4 POSITION LATCH SET CONTROL
                                SET=HIGH
02800   *                       BIT 5 RESET TOP DISPLAY
                                (YARDS, DOWNS)  RESET=HIGH
02900   *                       BIT 6 INCREMENT YARDS TO GO DISPLAY
                                HIGH=INC
03000   *                       BIT 7 INCREMENT DOWNS DISPLAY
                                HIGH=INC
03100   CONTR4  EQU   $13       CONTROL FOR PORT 4
03200   *
03300   PORT5   EQU   $20       PLAYER POSITION INPUT PORT
03400   *                       BITS 0-3 HORIZONTAL POSITION 0=LSB
03500   *                       BITS 4-7 VERTICAL POSITION 4=LSB
03600   CONTR5  EQU   $21       CONTROL FOR PORT 5 AND RESTART
                                DOWNS SWITCH KICKOFF SWITCH INPUT
                                BIT 7
03700   *
03800   PORT6   EQU   $22       PLAYER MOVE PORT
03900   *                       BITS 0-3 PLAYER NUMBER 0=LSB
04000   *                       BIT 4 HORIZONTAL MOVE OUTPUT
                                1=LEFT; 0=RIGHT
04100   *                       BIT 5 VERTICAL MOVE OUTPUT 1=UP;
                                0=DOWN
```

```
04200    *                              BIT 6 HORIZONTAL MOVE ENABLE
                                        0=NO MOVE; 1=MOVE
04300        *                          BIT 7 VERTICAL MOVE ENABLE 0=NO
                                        MOVE; 1=MOVE
04400    CONTR6   EQU   $23             CONTROL FOR PORT 6
04500    *
04600     PAGE
04700    *
04800    *CONTROL PORTION OF THE T. V. TEAMS PROGRAM
04900    *----------------
05000    *THIS PROGRAMS CALLS THE SUBROUTINES THAT PERFORM THE
         DIFFERENT
05100    *PARTS OF THE FOOTBALL GAME
05200    *THIS PROGRAM STARTS AT ADDRESS A050
05300    *
05400    *
05500             ORG   $A050
05600    START    JSR   INIT            INITALIZE CONTROL REGISTERS AND
                                        I/O PORTS
05700             CLR   SIDE            SET WHITE TEAM UP AS OFFENSIVE
05800    STARTA   CLR   PLAYER          CLEAR PLAYER NUMBER
05900             LDA A #50             SET TOTAL YARDS TO GO FOR SCORE
06000             STA A TOTAL
06100             STA A DISTOT
06200             JSR   INITDP          INITIALIZE DISPLAY VARIABLES
06300    START1   JSR   TOPDSP          CALL TOP DISPLAY SET UP
06400             JSR   GND             GROUND ALL PLAYERS
06500             LDA A #$40
06600             STA A LOOP            SET LOOP COUNT FOR POSITION
                                        PLAYERS SUBROUTINE
06700             JSR   POSIT
06800             LDA A PORT3           ENABLE PLAYERS TURN OFF SCORE BOARD
06900             AND A #$EF
07000             STA A PORT3
07100             LDA B PORT4           SET UP YARD LINE MARKER
07200             LDA A DISTOT          GET YARD LINE MARKER POSITION
07300             BPL   START2          BRANCH IF MARKER COLOR IS WHITE
                                        (MSB=0)
07400             ORA B #$02            SET COLOR TO BLACK
07500             BRA   START3          BRANCH
07600    START2   AND B #$FD            SET COLOR TO WHITE
07700    START3   STA B PORT4
07800             AND A #$7F            CLEAR THE COLOR BIT OFF
07900             LDA B DOWN
08000             STA B TEMP4
08100             STA A DOWN
08200             JSR   TOPDSP          CALL DISPLAY SET UP ROUTINE SET
                                        DISPLAY NUMBER
08300             LDA A TEMP4
08400             STA A DOWN
08500             JSR   KEYBRD          CALL KEYBOARD INPUT ROUTINE
08600             JSR   PLAY            CALL PLAY MOVE PLAYERS
08700             LDA A PORT3           ENABLE WHISTLE
08800             ORA A #$80
08900             STA A PORT3
09000             LDX  #$0400
09100             JSR   WAIT            CALL WAIT BEFORE DISABLING THE
                                        PLAYERS
09200             JSR   SCORE           CALL SCORE  INCREMENT DISPLAYS
```

```
09300                BRA  START1     KICK OFF SWITCH NOT SET BRANCH
09400        PAGE
09500     *
09600     *INITIALIZE SUBROUTINE
09700     *----------------------
09800     *INITIALIZE ALL INPUT PORTS AND OUTPUT PORTS BY SETTING
          THE DATA DIRECTION
09900     *AND CONTROL REGISTERS OF THE PIA'S
10000     *
10100     INIT   CLR A               CLEAR CONTROL REGISTERS
10200            STA A CONTR1
10300            STA A CONTR2
10400            STA A CONTR3
10500            STA A CONTR4
10600            STA A CONTR5
10700            STA A CONTR6
10800            STA A PORT5         SET UP INPUT PORT
10900            LDA A #$F8          SET PORT2 AS PART INPUT AND PART
                                     OUTPUT. BITS 0-2 ARE INPUT BITS 4-7 ARE OUTPUT
11000            STA A PORT2
11100            LDA A #$FF          SET UP OUTPUT PORTS
11200            STA A PORT1
11300            STA A PORT3
11400            STA A PORT4
11500            STA A PORT6
11600            LDA A #$36          FIX CONTROL REGISTERS
11700            STA A CONTR1
11800            STA A CONTR2
11900            STA A CONTR3
12000            STA A CONTR4
12100            STA A CONTR5
12200            STA A CONTR6
12300            RTS                 RETURN
12400        PAGE
12500     *
12600     *GROUND SUBROUTINE
12700     *------------------
12800     *THIS SUBROUTINE SENDS ALL PLAYERS TO THE BOTTOM RIGHT
          CORNER. IN SOME
12900     *CASES A PLAYER CAN GET "STUCK" IN THE TOP RIGHT CORNER.
13000     *THIS SUBROUTINE PREVENTS THIS FROM HAPPENING
13100     *
13200     GND    LDA A #$A0
13300            STA A LOOP          SET LOOP COUNTER CONTROLS NUMBER
                                     OF TIMES GND IS REPEATED
13400            LDA A #$FF
13500            STA A TIME          SET DUTY CYCLE TIMMER CONTROLS
                                     LENGTH OF OUTPUT PULSE
13600     GND1   LDA A PLAYER        GET PLAYER TO BE OPERATED ON'S
                                     NUMBER
13700            ORA A #$C0          APPEND MOVE COMMAND
13800            JSR OUTPUT          CALL OUTPUT PROGRAM
13900            JSR VALID           CALL INCREMENT PLAYER NUMBER
14000            BCC GND1            BRANCH IF VALID PLAYER NUMBER
14100            DEC LOOP            DECREMENT LOOP COUNT
14200            BNE GND1            REPEAT IF NOT FINISHED
14300            RTS                 RETURN
14400     *
14500     *
```

```
14600       *
14700       *OUTPUT SUBROUTINE
14800       *---------------
14900       *THIS PROGRAM OUTPUTS THE MOVE COMMAND TO THE PLAYER
              CONTROL CIRCUIT
15000       *REGISTER A CONTAINS THE PLAYER NUMBER AND DESIRED MOVE
15100       *REGISTER B IS USED TO STORE THE PLAYER NUMBER
15200       *THE DUTY CYCLE OF THE OUTPUT PULSE IS CONTROLLED BY THE
              VARIABLE TIME
15300       *
15400       OUTPUT  LDA B PLAYER      READ PLAYER NUMBER
15500       OUTPUM  STA B PORT6       OUTPUT PLAYER NUMBER ONLY
15600               STA A PORT6       OUTPUT PLAYER NUMBER AND MOVE
15700               LDA A TIME        SET COUNTER FOR DUTY CYCLE
15800       WAITOP  DEC A             DECREMENT COUNTER
15900               BNE   WAITOP
16000               STA B PORT6       CLEAR OUTPUT STOP PULSE
16100               RTS               RETURN
16200         PAGE
16300       *
16400       *VALID SUBROUTINE
16500       *---------------
16600       *THIS SUBROUTINE INCREMENTS THE PLAYER NUMBER AND CONTROLS
              THE MEMORY
16700       *POINTER
16800       *PLAYER NUMBERS 0-4 ARE FOR LEFT SIDE
16900       *PLAYER NUMBERS 8-C ARE FOR RIGHT SIDE
17000       *THE BALL IS NOT CONTROLLED BY THIS PROGRAM
17100       *WHEN THE PLAYER NUMBER IS GREATER THAN C THE CARRY IS SET
              AND THE
17200       *PLAYER NUMBER IS SET TO 0 AND THE MEMORY POINTER IS SET
              BACK TO START OF
17300       *THE DATA TABLE
17400       *INDEX REGISTER (X) IS USED AS THE MEMORY POINTER
17500       *
17600       VALID   INC   PLAYER      INCREMENT THE PLAYER NUMBER
17700               INX               INCREMENT MEMORY POINTER
17800               LDA A PLAYER      READ PLAYER NUMBER FOR TESTING
17900               CMP A #$04        TEAT FOR OFFENSIVE PLAYER
18000               BLS   ENDVAL      OK BRANCH TO END
18100               CMP A #$07        TEST FOR DEFENSE PLAYER
18200               BHI   VALID1      DEFENSE BRANCH
18300               LDA A #$08        NOT OFFENSE OR DEFENSE SET TO
                                      DEFENSE
18400               STA A PLAYER
18500               BRA   ENDVAL      BRANCH TO END
18600       VALID1  CMP A #$0C        TEST FOR DEFENSIVE PLAYER
18700               BLS   ENDVAL      OK BRANCH TO END
18800               CMP A #$0F        TEST FOR BALL
18900               BHI   VALID2      IF NOT BALL BRANCH
19000               LDA A #$0F        LOAD PLAYER NUMBER TO BALL
19100               STA A PLAYER      STORE
19200               BRA   ENDVAL      BRANCH TO END
19300       VALID2  CLR   PLAYER      NO PLAYER NUMBER CLEAR PLAYER
                                      NUMBER
19400               LDX   POINTR      RESET MEMORY POINTER
19500               SEC               SET CARRY
19600               RTS               RETURN
19700       ENDVAL  CLC               CLEAR CARRY VALID PLAYER NUMBER
19800               RTS               RETURN
19900         PAGE
```

```
20000        *
20100        *TOPDSP SUBROUTINE
20200        *------------------
20300        *SETS UP THE TOP OF THE SCORE BOARD DISPLAY
20400        *THE TOP OF THE SCORE BOARD CONTAINS THE DOWN NUMBER
20500        *ON THE LEFT AND THE YARDS TO GO ON THE RIGHT
20600        *
20700        TOPDSP   LDA A PORT4      GENERATE RESET TOP OF DISPLAY
                                       PULSE
20800                 ORA A #$20
20900                 STA A PORT4
21000                 AND A #$DF
21100                 STA A PORT4
21200                 LDA B YTOGO      READ YARDS TO GO COUNT
21300        TOP1     LDA A PORT4      GENERATE INCREMENT YARDS TO GO
                                       PULSE
21400                 ORA A #$40
21500                 STA A PORT4
21600                 AND A #$BF
21700                 STA A PORT4
21800                 DEC B            DECREMENT B
21900                 BNE TOP1         BRANCH IF NOT DONE
22000                 LDA B DOWN       READ DOWNS COUNT
22100        TOP2     LDA A PORT4      GENERATE INCREMENT DOWNS PULSE
22200                 ORA A #$80
22300                 STA A PORT4
22400                 AND A #$7F
22500                 STA A PORT4
22600                 DEC B            DECREMENT B
22700                 BNE TOP2         BRANCH IF NOT DONE
22800                 RTS              RETURN
22900          PAGE
23000        *
23100        *POSIT SUBROUTINE
23200        *------------------
23300        *POSITION PLAYERS IN A LINE UP
23400        *
23500        POSIT    CLR   PLAYER     CLEAR PLAYER NUMBER
23600                 LDX   #POS       LOAD MEMORY POINTER
23700                 STX   POINTR     STORE IN POINTER FOR LATER USE
23800                 LDA A #$80
23900                 STA A TIME       SET UP DUTY CYCLE TIMER
24000        POSIT1   JSR   READ       READ PLAYER POSITION
24100                 JSR   DECIDE     DETERMINE MOVE
24200                 JSR   OUTPUT     OUTPUT MOVE
24300                 JSR   VALID      INCREMENT PLAYER NUMBER
24400                 BCC   POSIT1     BRANCH IF NOT DONE
24500                 DEC   LOOP       DECREMENT LOOP COUNTER
24600                 BNE   POSIT1     BRANCH IF NOT DONE
24700                 RTS              RETURN
24800          PAGE
24900        *READ SUBROUTINE
25000        *------------------
25100        *READ PLAYER POSITION
25200        *OUTPUT THE PLAYER NUMBER THEN WAIT FOR A COMPLETE RESTER
                SCAN (16MSEC)
25300        *THAN READ THE POSITION OF THE PLAYER
25400        *THE EXTERNAL POSITION LATCH IS SET TO FF BY A LOW TO HIGH
                PULSE
25500        *POSITION WORD INPUT
25600        *          4MSB=VERTICAL POSITION
```

```
25700   *          0=TOP OF SCREEN
25800   *          F=BOTTOM OF SCREEN
25900   *          4LSB=HORIZONTAL POSITION
26000   *          0=LEFT SIDE OF SCREEN
26100   *          F=RIGHT SIDE OF SCREEN
26200   *
26300   READ    LDA B PLAYER      READ PLAYER NUMBER
26400   READM   STA B PORT6       OUTPUT PLAYER NUMBER
26500           LDA A PORT4       GENERATE RESET POSITION LATCH PULSE
26600           ORA A #$10
26700           STA A PORT4
26800           AND A #$EF
26900           STA A PORT4
27000           CLR B
27100           LDA A #$09        WAIT FOR 16MSEC
27200   READ1   DEC B
27300           BNE  READ1        BRANCH IF NOT DONE
27400           DEC A
27500           BNE  READ1        BRANCH IF NOT DONE
27600           LDA A PORT5       READ PLAYER POSITION
27700           RTS               RETURN
27800     PAGE
27900   *
28000   *DECIDE SUBROUTINE
28100   *------------------
28200   *THIS SUBROUTINE DETERMINES THE MOVE REQUIRED TO PUT
          THE PLAYER INTO THE
28300   *DESIRED LINE-UP POSITION
28400   *
28500   DECIDE  STA A TEMP1       SAVE PLAYER POSITION
28600           AND A #$0F        SAVE ONLY HORIZONTAL POSITION
28700           LDA B 0,X         READ DESIRED POSITION
28800           AND B #$0F        SAVE ONLY HORIZONTAL POSITION
28900           CBA               COMPARE ACTUAL WITH DESIRED
29000           BLS  RIGHT        IF ACTUAL LESS THAN DESIRED THAN
                                  BRANCH TO MOVE RIGHT
29100   LEFT    LDA A #$50        LOAD MOVE LEFT COMMAND
29200           BRA  HORZ1        BRANCH ALWAYS
29300   RIGHT   LDA A #$40        LOAD MOVE RIGHT COMMAND
29400   HORZ1   STA A TEMP2       STORE MOVE COMMAND
29500           LDA A TEMP1       READ PLAYER POSITION
29600           AND A #$F0        SAVE ONLY THE VERTICAL POSITION
29700           LDA B 0,X         READ DESIRED POSITION
29800           AND B #$F0        SAVE ONLY THE VERTICAL POSITION
29900           CBA               COMPARE ACTUAL WITH DESIRED
30000           BLS  DOWN1        BRANCH TO MOVE DOWN
30100   UP      LDA A #$A0        LOAD MOVE UP COMMAND
30200           BRA  VERT1
30300   DOWN1   LDA A #$80        LOAD MOVE DOWN COMMAND
30400   VERT1   ORA A TEMP2       APPEND HORIZONTAL MOVE
30500           ORA A PLAYER      APPEND PLAYER NUMBER
30600           RTS               RETURN
30700     PAGE
30800   *
30900   *
31000   *
31100   *KEYBOARD SUBROUTINE
31200   *--------------------
31300   *        THIS SUBROUTINE CREATES THE MOVEMENT TABLE FOR
                 EACH PLAYER AND
31400   *AT THE SAME TIME KEEPS THE PLAYERS IN THEIR LINE-UP
          POSITION
```

```
31500   *THE FIRST PART OF THE SUBROUTINE IS SIMULAR TO THE LINE-UP
         SUBROUTINE AND IS
31600   *USED TO HOLD THE PLAYERS IN POSITION. WHILE THE OPERATORS
         ARE KEYING IN THEIR
31700   *PROGRAMMED MOVES. THE KEYBOARD IS READ AND THE INPUTS
         DEBOUNCED. VALID INPUT DATA
31800   *IS STORED IN THE MOVE TABLE.
31900   *
32000   *
32100   KEYBRD  JSR   CLEAR      CLEAR THE VARIABLES FOR THE TABLE
                                 MAKING SUBROUTINE
32200   KEYBR1  JSR   READ       READ THE PLAYER POSITION
32300           JSR   DECIDE     DETERMINE MOVE TO CORRECT POSITION
32400           JSR   OUTPUT     OUTPUT CORRECTION MOVE
32500           JSR   VALID      INCREMENT THE PLAYER NUMBER
32600           STX   TEMP3      STORE X REGISTER
32700           JSR   TABLER     CREATE MOVE TABLE
32800           LDX   TEMP3      RESTORE X REGISTER
32900           TST   FLAG2L     TEST FOR TABLE FINISHED
33000           BEQ   KEYBR1
33100           TST   FLAG2R
33200           BEQ   KEYBR1
33300           RTS              RETURN
33400   PAGE
33500   CLEAR   CLR   FLAG2L     CLEAR THE OFFENSIVE KEYBOARD DONE
                                 FLAG
33600           CLR   FLAG2R     CLEAR THE DEFENSE KEYBOARD DONE
                                 FLAG
33700           CLR   CMNDR      CLEAR MOVE COUNT FOR RIGHT KEYBOARD
33800           CLR   CMNDL      CLEAR MOVE COUNT FOR LEFT KEYBOARD
33900           CLR   PNUML      CLEAR PLAYER NUMBER LEFT
34000           CLR   PNUMR      CLEAR PLAYER NUMBER LEFT
34100           CLR   CRNTL
34200           CLR   CRNTR
34300           CLR   OLDL
34400           CLR OLDR
34500           CLR   VALIDL
34600           CLR   VALIDR
34700           CLR   FLAG1L
34800           CLR   FLAG1R
34900           LDA A #$FC
35000           STA A COUNTL
35100           STA A COUNTR
35200           LDA A   #220
35300           STA A   BLINKL
35400           STA A   BLINKR
35500           LDA A #$40       SET DUTY CYCLE TIMMER
35600           STA A TIME
35700           RTS              RETURN
35800   PAGE
35900   *MOVE 3 PLAYERS SUBROUTINE
36000   *--------------------------
36100   *       THIS SUBROUTINE MOVES 3 PLAYERS  THAN RETURNS TO
                THE CALLING ROUTINE.  IT
36200   *UPDATES ALL THE COUNTERS THAT CONTROL THE WAY THE MOVE
36300   *
36400   MOVE3   LDA A #$03       SET LOOP COUNTER
36500           STA A TEMP1
36600   MOVE31  LDA B PLAYER
36700           LDA A 0,X        GET MOVE
```

```
36800                ABA              APPEND PLAYER NUMBER TO A
36900                JSR   OUTPUT     OUTPUT MOVE
37000                JSR   VALID      INCREMENT PLAYER NUMBER
37100                LDA A PLAYER     CHECK FOR VALID PLAYER
37200                CMP A #$0F       IF BALL CLEAR
37300                BNE   MOVE32
37400                JSR   VALID
37500                DEC LOOP         DECREMENT REPEAT COUNTER
37600                BNE MOVE32       BRANCH IF NOT ZERO
37700                LDA A #$30
37800                STA A LOOP       RESET REPEAT COUNTER
37900                LDA A COUNT      READ MOVE COUNTER
38000                DEC A            DECREMENT
38100                BEQ   MOVE32
38200                STA A COUNT      STORE MOVE COUNTER
38300                LDA A #$0A       LOAD COUNTER
38400                LDX   POINTR     LOAD MEMORY POINTER
38500   MOVE3A       INX              INCREMENT MEMORY POINTER
38600                DEC A
38700                BNE MOVE3A
38800                STX   POINTR     REPLACE NEW MEMORY POINTER
38900   MOVE32       DEC   TEMP1
39000                BNE MOVE31       BRANCH BACK IF NOT DONE
39100                RTS              RETURN IF NOT DONE
39200        PAGE
39300   *SCORE SUBROUTINE
39400   *-----------------
39500   * RULES:
39600   *     PLAY STARTS AT 50 YARD LINE
39700   *     TACKLE  TEAM GETS THE YARDS GAINED OR LOST
39800   *     INCOMPLETE PASS   LOSE DONW
39900   *     INTERCEPTED PASS   LOES BALL OTHER TEAM STARTS AT
                   POINT OF INTERCEPTION
40000   *     SCORE  BALL CARRIER RUNS OFF SCREEN OR TOTAL YARDS
                   GAINED EQUALS 100
40100   *     LOSE BALL AFTER 4TH DOWN IF YOU DON'T GAIN 10 YARDS
40200   *CALCULATIONS:
40300   *     BALL CARRIER - 08= YARDES GAINED OR LOST
40400   *     YARDS TO GO-YARDS GAINED OR LOST=NEW YARDS TO GO
40500   *     TOTAL+YARDS GAINED OR LOST=NEW TOTAL
40600   *INPUTS:
40700   *     INTPAS   INTERCEPTED PASS FLAG
40800   *     INCPAS   INCOMPLETE PASS FLAG
40900   *     POSITN   CURRENT BALL CARRIER POSITION
41000   *     YTOGO    YARDS TO GO
41100   *     TOTAL    TOTAL YARDS GAINED
41200   *     DISTOT   YARD LINE MARKER FOR DISPLAY
41300   *              MSB=1 DISPLAY BLACK
41400   *              MSB=0 DISPLAY WHITE
41500   *     DOWN     DOWN COUNT
41600   *OUTPUTS:
41700   *     YTOGO    NEW VALUE OF YARDS TO GO
41800   *     TOTAL    NEW VALUE OF TOTAL YARDS GAINED
41900   *     DOWN     NEW VALUE OF DOWN COUNT
42000   *     DISTOT   NEW VALUE OF YARD MARKER POSITION FOR
                      DISPLAY
42100   *
42200   SCORE        LDA A PORT3      ENABLE SCORE BOARD DISABLE PLAYERS
42300                EOR A #$90       SET BIT 4 CLEAR BIT 7 LEAVE ALL
                                      OTHERS UNCHANGED
42400                STA A PORT3
```

```
42500            INC  DOWN          INCREMENT THE DOWN COUNT
42600            TST  INCPAS
42700            BMI  SCORE5        BRANCH IF INCOMPLETE PASS
42800            TST  INTPAS
42900            BPL  SCORE1        BRANCH IF NOT INTERCEPTED PASS
43000            LDA B #$05
43100            STA B DOWN         SET TO 5TH DOWN TO CHANGE TEAMS
43200   SCORE1   LDA B POSITN       READ FINAL BALL CARRIER POSITION
43300            AND B #$0F         SAVE ONLY HORIZONTAL COMPONENT OF
                                    POSITION

43400            CMP B #$0F         CHECK FOR OFF SCREEN (SCORE)
43500            BNE  SCORE2        BRANCH IF NOT OFF SCREEN
43600            LDA A #100         SET TOTAL YARDS TO 100 (SCORE)
43700            STA A TOTAL
43800   SCORE2   SUB B #$08         CALCULATE YARDS GAINED OR LOST
43900            ASL B              SCALE RESULT (MULTIPLE BY 2)
44000            LDA A YTOGO
44100            SBA                CALCULATE NEW YARDS TO GO VALUE
44200            BGT  SCORE3        BRANCH IF GREATER THAN 0
44300            JSR  INITDP        CALL INITIALIZE DISPLAY VARIABLES
                                    ROUTINE

44400   SCORE3   STA A YTOGO        STORE NEW VALUE OF YARDS TO GO
44500            ADD B TOTAL        CALCULATE NEW TOTAL
44600            CMP B #99          CHECK FOR OVER 100 YARDS GAINED
                                    (SCORE)
44700            BLS  SCORE4        BRANCH IF LESS THEN 100 YARDS
                                    GAINED
44800            JSR  INITDP        INITIALIZE DISPLAY VARIABLES
44900            CLR  SIDE          CHANGE OFFENSIVE TEAM
45000            JSR  SRINE         CALL SOUND SRINE SUBROUTINE
45100            LDA B #50
45200   SCORE4   STA B TOTAL        STORE NEW VALUE OF TOTAL YARDS
                                    GAINED

45300   SCORE5   LDA A DOWN
45400            CMP A #$05         CHECK FOR LAST DOWN
45500            BNE  SCORE6        BRANCH IF NOT LAST DOWN
45600            JSR  INITDP        INITIALIZE DISPLAY VARIABLES
45700            COM  SIDE          CHANGE OFFENSIVE TEAM
45800            LDA A PORT3        CHANGE COLOR OF OFFENSIVE TEAM
45900            EOR A #$20
46000            STA A PORT3
46100            LDA A #100         CALCULATE NEW VALUE OF TOTAL YARDS
                                    GAINED

46200            SUB A TOTAL
46300            STA A TOTAL        TRANSFER TOTAL YARDS TO B
46400   SCORE6   LDA B TOTAL        CHECK FOR YARD LINE COLOR
46500            CMP B #50          BRANCH IF GREATER
46600            BGT  SCORE7        CLEAR MSB
46700            AND B #$7F         TRANSFER B TO A
46800            TBA                BRANCH
46900            BRA  SCORE8        CALCULATE YARD LINE MARKER
47000   SCORE7   LDA A #100
47100            SBA                SET MSB COLOR BIT
47200            ORA A #$80         DETERMINE WHO IS THE OFFENSIVE TEAM
47300   SCORE8   TST  SIDE          BRANCH IF WHITE IS OFFENSE
47400            BPL  SCORE9        COMPLEMENT COLOR CONTROL SIGNAL
47500            EOR A #$80
47600
47700   SCORE9   STA A DISTOT       STORE NEW VALUE OF YARD LINE MARKER
                                    NUMBER
```

```
47800              RTS             RETURN
47900       PAGE
48000  *PLAY SUBROUTINE
48100  *---------------
48200  *       THIS SUBROUTINE EXECUTIES THE PLAY STORED IN THE
               MOVE TABLE.  ALL PLAYERS START
48300  *WITH THE QUARTERBACK CONTROLLING THE BALL.  THE OFFENSE
               OPERATOR MAY SELECT
48400  *TO PASS THE BALL BY DEPRESSING A KEY.  IF A TACKLE OCCURS
               AT ANY TIME THE PLAY IS ENDED.
48500  *
48600       PLAY    CLR   PLAYER
48700               CLR   TACKLE    CLEAR TACKLE FLAG
48800               CLR   PASSFG    CLEAR THE PASS FLAG
48900               CLR   INCPAS    CLEAR INCOMPLETE PASS FLAG
49000               CLR   COMPAS    CLEAR COMPLETE PASS FLAG
49100               CLR   INTPAS    CLEAR INTERCEPTED PASS FLAG
49200               CLR   VALIDL    CLEAR KEYBOARD INPUT WORD
49300               LDA A #$40      SET DUTY CYCLE TIMER
49400               STA A TIME
49500               LDA A #$30      SET LOOP COUNTER
49600               STA A LOOP
49700               LDA A #$05      SET MOVE COUNTER
49800               STA A COUNT
49900               LDX   #TABLE    SET MOVE TABLE POINTER
50000               STX   POINTR
50100               JSR   HIKE      CALL HIKE TO START PLAY
50200               TST   TACKLE    TEST THE TACKLE FLAG
50300               BMI   PLAY1     BRANCH IF TACKLE SET
50400               JSR   PASS      CALL PASS PLAY
50500       PLAY1   TST   TACKLE    TEST TACKLE FLAG
50600               BMI   PLAY2     BRANCH IF TACKLE SET
50700               JSR   RUN       CALL RUN PLAY
50800       PLAY2   RTS             RETURN
50900  *
51000  *
51100       PAGE
51200  *HIKE SUBROUTINE
51300  *---------------
51400  *       THIS SUBROUTINE HIKES THE BALL FROM THE CENTER TO
               THE QUARTERBACK AND MOVES
51500  *THE PLAYER ACCORDING TO THE PREPROGRAMMED MOVES STORED IN
               THE MOVE TABLE.  THIS
51600  *PROGRAM ALSO CHECKS THE KEYBOARD FOR A PASS COMMAND AND
               CHECKS FOR COINICIDENCE BETWEEN
51700  *THE QUARTERBACK AND THE DEFENSIVE TEAM.  IF COINICIDENCE
               OCCURS THE TACKLE FLAG IS SET.
51800  *IF A PASS OCCURS THE PASS FLAG IS SET.  THIS PROGRAM IS
               DONE WHEN EITHER THE TACKLE
51900  *FLAG OR PASS FLAG ARE SET.
52000  *
52100       HIKE    LDA A #$03      SET BALL CARRIER NUMBER
52200               STA A BALCY     STORE BALL CARRIER NUMBER
52300               LDA A PORT3
52400               AND A #$F0
52500               ORA A BALCY
52600               STA A PORT3     OUTPUT NEW BALL CARRIER
52700               LDA A #$F0
52800               STA A PORT2     SET FOR COINICIDENCE BETWEEN
```

DEFENSE AND BALL CARRIER

```
52900  HIKE1    LDA A PORT4
53000           ORA A #$04
53100           STA A PORT4
53200           AND A #$FB
53300           STA A PORT4     RESET COINICIDENCE LATCH
53400           LDA A PORT3     RESET COINICIDENCE FLAG
53500           JSR MOVE3       MOVE 3 PLAYERS
53600  HIKE2    LDA B BALCY     GET THE BALL CARRIER NUMBER FOR
                                READING HS POSITION
53700           JSR  READM      CALL READ MODIFIED SUBROUTINE
53800           CMP A #$FF      CHECK FOR VALID DATA
53900           BEQ  HIKE8
54000           STA A POSITN    SAVE BALL CARRIER POSITION
54100  HIKE3    JSR  KEYL
54200           TST  VALIDL     TEST FOR VALID KEYBOARD INPUT
54300           BEQ  HIKE4      BRANCH IF NO KEYBOARD INPUT
54400           LDA A POSITN    LOAD THE BALL CARRIER LAST POSITION
54500           AND A #$0F      SAVE ONLY THE HORIZONTAL POSITION
54600           CMP A #$07      CHECK TO SEE IF BALL CARRIER PAST
                                THE LINE OF SCRIMAGE  CAN'T PASS IF
                                PASS LINE OF SCRIMAGE
54700           BLS  HIKE3A     BRANCH IF BEHIND THE LINE OF
                                SCRIMAGE
54800           LDA A VALIDL    READ PASS DIRECTION
54900           AND A #$0F      SAVE COLUMN NUMBER
55000           CMP A #$01      CHECK FOR FORWARD PASS COMMAND
55100           BNE  HIKE3A     BRANCH IF NOT FORWARD PASS
55200           LDA A #$FF      SET FLAGS INVALID PASS
55300           STA A TACKLE
55400           STA A INCPAS
55500  HIKE3A   LDA A #$FF
55600           STA A PASSFG    SET PASS FLAG
55700  HIKE4    LDA A CONTR3    READ COINICIDENCE INPUT
55800           BPL  HIKE5
55900           LDA A #$FF
56000           STA A TACKLE    SET TACKLE FLAG
56100  HIKE5    LDA A POSITN
56200           AND A #$F0      MASK OFF HORIZONTAL POSITION
56300           CMP A #$10      TEST FOR OUT OF BOUNDS (TOP)
56400           BHI  HIKE6
56500           LDA B #$FF
56600           STA B TACKLE    OUT OF BOUNDS SET TACKLE FLAG
56700  HIKE6    CMP A #$D0      TEST FOR OUT OF BOUNDS (BOTTOM)
56800           BLS  HIKE7
56900           LDA B #$FF
57000           STA B TACKLE    OUT OF BOUNDS SET TACKLE FLAG
57100  HIKE7    LDA A POSITN    CHECK FOR SCORE
57200           AND A #$0F      SAVE ONLY HORIZONTAL POSITION
57300           CMP A #$0F
57400           BLT  HIKE8      NOT A SCORE BRANCH
57500           LDA A #$FF      SET FLAGS FOR END OF PLAY
57600           STA A TACKLE
57700  HIKE8    TST  TACKLE     CHECK FOR FINISHED LOOP
57800           BMI  HIKE9      NOT DONE LOOP
57900           TST  PASSFG
58000           BMI  HIKE9      NOT DONE YET LOOP
58100           LDA B #$0F      READ BALL POSITION
58200           JSR  READM
58300           STA A TEMP1     BALL POSITION
58400           AND A #$0F      SAVE HORIZONTAL POSITION
```

```
58500             LDA B POSITN     READ QUARTERBACK POSITION
58600             AND B #$0F       SAVE ONLY THE HORIZONTAL POSITION
58700             CBA              COMPARE POSITIONS
58800             BLS   HIKE8B     BRANCH IF LESS OR SAME
58900   HIKE8A    LDA A #$50       LOAD MOVE LEFT COMMAND
59000             BRA   HIKE8C     BRANCH
59100   HIKE8B    LDA A #$40       LOAD MOVE RIGHT COMMAND
59200   HIKE8C    STA A TEMP3      STORE HORIZONTAL MOVE
59300             LDA A TEMP1      GET VERTICAL POSITION OF BALL
59400             AND A #$F0       SAVE ONLY VERTICAL POSITION
59500             LDA B POSITN     GET QUARTERBACK POSITION
59600             AND B #$F0       SAVE ONLY VERTICAL POSITION
59700             CBA              COMPARE POSITIONS
59800             BLS   HIKE8E     BRANCH TO MOVE DOWN IF LESS OR SAME
59900   HIKE8D    LDA A #$A0       LOAD MOVE UP COMMAND
60000             BRA   HIKE8F     BRANCH
60100   HIKE8E    LDA A #$80       LOAD MOVE DOWN COMMAND
60200   HIKE8F    ORA A TEMP3      PUT HORIZONTAL AND VERTICAL MOVES
                                   TOGEATHER
60300             ORA A #$0F       APPEND BALL NUMBER
60400             LDA B #$0F       LOAD BALL NUMBER FOR OUTPUT
                                   SUBROUTINE
60500             JSR   OUTPUM     CALL OUTPUT MOVE SUBROUTINE
60600             JMP   HIKE1      NOT DONE RETURN BACK TO START OF
                                   HIKE ROUTINE
60700   HIKE9     RTS              RETURN
60800         PAGE
60900   *PASS SUBROUTINE
61000   *---------------
61100   *         THIS SUBROUTINE MOVES THE BALL AND THE PLAYERS
                  WHILE WAITING FOR EITHER AN INCOMPLERT
61200   *PASS, A COMPLETE PASS, OR AN INTERCEPTED PASS.
61300   *
61400   PASS      LDA A #$F0       SET PASS COUNT TIMER
61500             STA A PASSCT     CONTROLS LENGTH OF TIME PASS MAY
                                   OCCUR
61600             LDA A VALIDL     READ KEYBOARD INPUT
61700             CLR   COINUM     CLEAR COINICIDENCE SELECT NUMBER
61800             JSR   DECODM     DECODE KEYBOARD INPUT GET BALL MOVE
                                   COMMAND
61900             LDA A #$08       SET PASS OUTPUT SIGNAL
62000             ORA A PORT4
62100             STA A PORT4
62200             LDA B PORT3      OUTPUT BALL CARRIER NUMBER
62300             AND B #$F0
62400             ORA B #$0F
62500             STA B PORT3
62600   PASS1     LDA A MMBR       READ BALL MOVE COMMAND
62700             ORA A #$0F       APPEND BALL NUMBER
62800             LDA B #$0F
62900             JSR   OUTPUM     CALL OUTPUT MODIFIED SUBROUTINE
63000             LDA A PORT2      OUTPUT COINICIDENCE SELECT NUMBER
63100             AND A #$0F
63200             ADD A COINUM     APPEND COINICIDENCE SELECT NUMBER
63300             STA A PORT2
63400             LDA A PORT4      RESET COINICIDENCE LATCH
63500             ORA A #$04
63600             STA A PORT4
63700             AND A #$FB
63800             STA A PORT4
```

```
63900              LDA A PORT3     RESET COINICIDENCE FLAG
64000              JSR  MOVE3      MOVE 3 PLAYERS
64100    PASS2     LDA B #$0F
64200              JSR  READM      CALL READ MODIFIED SUBROUTINE
64300              CMP A #$FF      CHECK FOR VALID DATA
64400              BEQ  PASS5
64500              STA A POSITN    SAVE POSITION
64600    PASS3     AND A #$F0      MASK OFF HORIZONTAL POSITION
64700              CMP A #$10      TEST FOR OUTPUT OF BOUNDS (TOP)
64800              BHI  PASS4      BRANCH IF NOT OUT OF BOUNDS
64900              LDA B #$FF      SET TACKLE IF OUT OF BOUNDS
65000              STA B TACKLE
65100              STA B INCPAS    SET INCOMPLETE PASS
65200    PASS4     CMP A #$D0      TEST FOR OUTPUT OF BOUNDS (BOTTOM)
65300              BLS  PASS4A     BRANCH IF NOT OUT OF BOUNDS
65400              LDA B #$FF      SET TACKLE IF OUT OF BOUNDS
65500              STA B TACKLE
65600              STA B INCPAS    SET INCOMPLETE PASS FLAG
65700    PASS4A    LDA A POSITN    READ PLAYER POSITION
65800              AND A #$0F      SAVE HORIZONTAL POSITION
65900              CMP A #$0F      CHECK FOR INCOMPLETE PASS OFF
                                   SCREEN
66000              BLT  PASS5      BRANCH IF GOOD PASS
66100              LDA A #$FF      SET FLAGS FOR INCOMPLETE PASS
66200              STA A TACKLE
66300              STA A INCPAS
66400    PASS5     DEC  PASSCT     DECREMENT PASS COUNTER
66500              BNE  PASS6      BRANCH IF NOT ZERO
66600              LDA A #$FF      SET TACKLE FLAG
66700              STA A TACKLE
66800              STA A INCPAS    SET INCOMPLETE PASS FLAG
66900    PASS6     LDA A CONTR3    TEST FOR COINICIDENCE FLAG SET
67000              BPL  PASS7      BRANCH IF COINICIDENCE FLAG NOT SET
67100              LDA A COINUM    READ COINICIDENCE SELECT NUMBER
67200              CMP A #$40.     COMPARE   CHECK FOR OFFENSIVE PLAYER
67300              BHI  PASS6A     BRANCH IF NOT OFFENSIVE PLAYR
67400              LDA B #$FF
67500              STA B COMPAS    SET COMPLETE PASS FLAG
67600    PASS6A    CMP A #$70
67700              BLS  PASS7
67800              LDA A #$FF
67900              STA A INTPAS    SET INTERCEPTED PASS FLAG
68000              STA A TACKLE    SET TACKLE FLAG
68100    PASS7     TST  INTPAS     CHECK PASS CONDITIONS FOR END OF
                                   LOOP
68200              BMI  PASS8
68300              TST  INCPAS
68400              BMI  PASS8
68500              TST  COMPAS
68600              BMI  PASS8
68700              LDA A COINUM
68800    PASS7A    ADD A #$10      INCREMENT COINICIDENCE SELECT
                                   NUMBER
68900              STA A COINUM    STORE NEW COINICIDENCE SELECT
                                   NUMBER
69000              CMP A #$30      CHECK FOR QUARTERBACK  QUARTERBACK
                                   CAN'T CATCH HIS OWN PASS
69100              BEQ  PASS7A     IF QUARTERBACK INCREMENT AGAIN
69200              CMP A #$10      CHECK FOR BLOCKER  BLOCKER CAN'T
                                   CATCH A PASS
```

```
69300              BEQ  PASS7A      BRANCH IF BLOCKER
69400              CMP  A #$40
69500              BLS  PASS7C
69600              CMP  A #$70
69700              BHI  PASS7B
69800              LDA  A #$80
69900              STA  A COINUM
70000              BRA  PASS7C
70100   PASS7B     CMP  A #$CO
70200              BLS  PASS7C
70300              CLR  COINUM
70400   PASS7C     JMP  PASS1       LOOP NOT FINISHED YET
70500   PASS8      LDA  A PORT4     DISABLE THE BALL
70600              AND  A #$F7
70700              STA  A PORT4
70800              TST  INCPAS      CHECK TO SEE IF NO ONE CAUGHT THE
                                    PASS
70900              BNE  PASS9       BRANCH TO STOP PLAYER BLINKING
71000              LDA  A COINUM    SET BALL CARRIER NUMBER TO PLAYER
                                    WHO COUGHT THE BALL
71100              LSR  A           SHIFT LEFT TO MOVE 4 MSB TO 4LSB
71200              LSR  A
71300              LSR  A
71400              LSR  A
71500              STA  A BALCY
71600              LDA  A PORT3     OUTPUT NEW BALL CARRIER NUMBER
71700              AND  A #$F0
71800              ORA  A BALCY
71900              STA  A PORT3
72000   PASS9      RTS              RETURN
72100         PAGE
72200   *RUN SUBROUTINE
72300   *---------------
72400   *       THIS SUBROUTINE CONTROLS THE BALL CARRIER AFTER A
                COMPLETED PASS.  THIS SUBROUTINE
72500   *STOPS PLAY AFTER THE BALL CARRIER IS TACKLED, GOES OUT OF
                BOUNDS, OR SCORES.
72600   *
72700   RUN        LDA  A #$F0      SET COINICIDENCE WITH DEFENSIVE
                                    TEAM
72800              STA  A PORT2
72900   RUN1       LDA  A PORT4     RESET COINICIDENCE LATCH
73000              ORA  A #$04
73100              STA  A PORT4
73200              AND  A #$FB
73300              STA  A PORT4
73400              LDA  A PORT3     RESET COINICIDENCE FLAG
73500              JSR  MOVE3
73600   RUN3       LDA  B BALCY     GET BALL CARRIER NUMBER
73700              JSR  READM       CALL READ MODIFIED SUBROUTINE TO
                                    FIND BALL CARRIER POSITION
73800              CMP  A #$FF      CHECK FOR VALID DATA
73900              BEQ  RUN8
74000              STA  A POSITN    SAVE BALL CARRIER POSITION
74100   RUN4       AND  A #$F0      MASK OFF THE HORIZONTAL POSITION
74200              CMP  A #$10      TEST FOR PLAYER OUT OF BOUNDS (TOP)
74300              BHI  RUN5        BRANCH IF NOT OUT OF BOUNDS
74400              LDA  B #$FF
74500              STA  B TACKLE    SET TACKLE FLAG  OUT OF BOUNDS
74600   RUN5       CMP  A #$D0      TEST FOR OUT OF BOUNDS (BOTTOM)
```

```
74700              BLS   RUN6        BRANCH IF NOT OUT OF BOUNDS
74800              LDA A #$FF
74900              STA A TACKLE      SET TACKLE FLAG OUT OF BOUNDS
75000     RUN6     LDA A POSITN      GET BALL CARRIER LAST POSITION
75100              AND A #$0F        SAVE ONLY THE HORIZONTAL POSITION
75200              CMP A #$0F        CHECK FOR SCORE
75300              BLT   RUN7        BRANCH IF NOT SCORE
75400              LDA A #$FF        SET FLAGS FOR END OF PLAY
75500              STA A TACKLE
75600     RUN7     LDA A CONTR3      CHECK FOR COINICIDENCE FLAG
75700              BPL   RUN8        BRANCH IF NO COINICIDENCE
75800              LDA A #$FF
75900              STA A TACKLE      SET TACKLE FLAG
76000     RUN8     TST   TACKLE
76100              BMI   RUN9        BRANCH IF TACKLE SET
76200              JMP   RUN1
76300     RUN9     RTS               RETURN
76400       PAGE
76500     *        INITIALIZE DISPLAY VARIABLES SUBROUTINE
76600     *INPUTS:
76700     *        DOWN       DOWN COUNT  (1 TO 4)
76800     *        YTOGO      YARDS TO GO
76900     *OUTPUTS:
77000     *        DOWN       NEW DOWN VALUE  (1ST)
77100     *        YTOGO      NEW YARDS TO GO VALUE  (10 YARDS)
77200     *
77300     INITDP   LDA A #$01        SET DOWN COUNT TO 1ST
77400              STA A DOWN
77500              LDA A #$0A        SET YARDS TO GO TO 10
77600              STA A YTOGO
77700              RTS               RETURN
```

PROGRAM LISTING B

```
00100     *TABLE MAKING SUBROUTINE
00200     *------------------------
00300     *        THIS SUBROUTINE MAKES THE MOVE TABLE FOR THE PLAY.
                   IT READS THE KEYBOARD DEBOUNCES THE KEY AND
00400     *STORES VALID DATA.  THE PROGRAM ALSO UPDATES THE BLINKING
                   PLAYER.  THE BLINKING PLAYER
00500     *SIGNALS THE OPERATOR AS TO WHICH PLAYER'S MOVES ARE BEING
                   UPDATED.
00600     *
00700     TABLER   LDA A BLINKL
00800              CMP A #$00
00900              BNE   B3
01000              INC   BLINKR
01100              BNE   B4
01200              LDA A #220              PRESET BLINKR, BLINKL
01300              STA A BLINKR
01400              STA A BLINKL
01500     B3       INC   BLINKL
01600              LDA A PORT3
01700              AND A #$F0
01800              ORA A PNUML
01900              STA A PORT3
02000              BRA   B5
02100     B4       LDA A PORT3
02200              AND A #$F0
```

```
02300           LDA B   PNUMR
02400           ADD B   #$08
02500           STA B   DUM1
02600           ORA A   DUM1
02700           STA A   PORT3
02800   B5      LDA A   FLAG2L
02900           CMP A   #$00
03000           BNE     B6
03100           JSR     KEYL
03200           LDA A   VALIDL
03300           CMP A   #$00
03400           BEQ     B6
03500           STA A   MMBR
03600           JSR     DECODE
03700           LDA A   CMNDL
03800           STA A   MULT
03900           JSR     TTEN
04000           LDA A   MULT
04100           ADD A   PNUML
04200           STA A   INDEX
04300           JSR     INDEXR
04400           LDA A   MMBR
04500           STA A   X
04600           INC     CMNDL
04700           LDA A   CMNDL
04800           CMP A   #$05
04900           BNE     B6
05000           CLR     CMNDL
05100           INC     PNUML
05200           LDA A   PNUML
05300           CMP A   #$05
05400           BNE     B6
05500           LDA A   #$01
05600           STA A   FLAG2L
05700   B6      LDA A   FLAG2R
05800           CMP A   #$00
05900           BNE     B16
06000           JSR     KEYR
06100           LDA A   VALIDR
06200           CMP A   #$00
06300           BEQ     B16
06400           STA A   MMBR
06500           JSR     DECODE
06600           LDA A   CMNDR
06700           STA A   MULT
06800           JSR     TTEN
06900           LDA A   MULT
07000           ADD A   PNUMR
07100           STA A   INDEX
07200           JSR     INDEXR
07300           LDA A   MMBR
07400           STA A   5,X
07500           INC     CMNDR
07600           LDA A   CMNDR
07700           CMP A   #$05
07800           BNE     B16
07900           CLR     CMNDR
08000           INC     PNUMR
08100           LDA A   PNUMR
08200           CMP A   #$05
08300           BNE     B16
08400           LDA A   #$01
08500           STA A   FLAG2R
```

```
08600        *      UPDATE LED'S
08700        *
08800   B16     LDA   B    PORT1
08900           AND   B    #$CO
09000           LDA   A    FLAG2L
09100           CMP   A    #$00
09200           BEQ        B18
09300           LDA   A    FLAG2R
09400           CMP   A    #$00
09500           BEQ        B17
09600           ORA   B    #$3F
09700           BRA        B20
09800   B17     ORA   B    #$1F
09900           BRA        B20
10000   B18     LDA   A    FLAG2R
10100           CMP   A    #$00
10200           BEQ        B19
10300           ORA   B    #$3B
10400           BRA        B20
10500   B19     ORA   B    #$1B
10600   B20     STA   B    PORT1
10700           RTS
```

PROGRAM LISTING APPENDIX C

```
00100   *KEYBOARD READ SUBROUTINE
00200   *----------------------------
00300   *       THIS SUBROUTINE READS AND DEBOUNCES THE LEFT
                KEYBOARD
00400   *
00500   *
00600   KEYL    CLR        VALIDL
00700           LDA A      #$04            INITIALIZE STROBE
00800   SCANL   STAA       STROBE
00900           LDA A      PORT1
01000           AND A #$CO
01100           ORA A      STROBE
01200           COM A
01300           STA A      PORT1
01400           LDA B      PORT2
01500           COM B
01600           ASLB                       REMOVE SPURIOUS BITS
01700           ASLB
01800           ASLB
01900           ASLB
02000           ASLB       B CONTAINS HIGH ORDER CODE
02100           CMP B      #$00            KEY DEPRESSED?
02200           BEQ        SHIFTL
02300           STAB       CRNTL           YES
02400           LDA A      #$01
02500           STA A      FLAG1L
02600           CMP B      OLDL
02700           BEQ        B1L
02800           LDA A #$FC        PRESET COUNTL
02900           STA A COUNTL
03000           STA B      OLDL
03100           BRA        SHIFTL
03200   B1L     LDA A      COUNTL
03300           INC A
```

```
03400              BEQ     SHIFTL        BRANCHES IF COUNT ALREADY
                                         $FF
03500              STA A   COUNTL
03600              INC A
03700              BNE     SHIFTL        BRANCHES IF COUNT NOT $FF
03800              ORA B   STROBE        KEY DEBOUNCED
03900              STA B   VALIDL
04000    SHIFTL    LDA A   STROBE        NO, SHIFT STROBE
04100              ASR A
04200              BCC     SCANL
04300              LDA B   FLAG1L
04400              CMP B   #$00
04500              BEQ     B2L
04600              CLR     FLAG1L
04700              BRA     KRTL
04800    B2L       LDA A #$FC            PRESET COUNTL
04900              STA A COUNTL
05000    KRTL      RTS
05100       PAGE
05200    *KEYBOARD READ SUBROUTINE
05300    *-------------------------
05400    *         THIS SUBROUTINE READS AND DEBOUNCES THE RIGHT
                   KEYBOARD
05500    *
05600    KEYR      CLR     VALIDR
05700              LDA A   #$04          INITIALIZE STROBE
05800    SCANR     STA A   STROBE
05900              ASL A
06000              ASL A
06100              ASL A
06200              STA A   STRBO
06300              LDA A   PORT1
06400              AND A   #$C0
06500              ORA A   STRBO
06600              COM A
06700              STA A   PORT1
06800              LDA B   PORT2
06900              COM B
07000              ASL B                 REMOVE SPURIOUS BITS
07100              ASL B
07200              ASL B
07300              ASL B
07400              ASL B
07500              CMP B   #$00
07600              BEQ     SHIFTR
07700              STA B   CRNTR
07800              LDA A   #$01
07900              STA A   FLAG1R
08000              CMP B   OLDR
08100              BEQ     B1R
08200              LDA A #$FC            PRESET COUNTR
08300              STA A COUNTR
08400              STA B   OLDR
08500              BRA     SHIFTR
08600    B1R       LDA A   COUNTR
08700              INC A
08800              BEQ     SHIFTR        BRANCHES IF COUNT ALREADY
                                         $FF
08900              STA A   COUNTR
09000              INC A
09100              BNE     SHIFTR        BRANCHES IF COUNT NOT $FF
09200              ORA B   STROBE
```

```
09300                STA B   VALIDR
09400   SHIFTR  LDA A   STROBE
09500                ASR A                       SHIFT STROBE
09600                BCC     SCANR
09700                LDA B   FLAG1R
09800                CMP B   #$00
09900                BEQ     B2R
10000                CLR     FLAG1R
10100                BRA     KRTR
10200   B2R     LDA A #$FC
10300                STA A COUNTR      PRESET COUNTR
10400   KRTR    RTS
10500   *KEYBOARD DECODE SUBROUTINE
10600   *---------------------------
10700   *       THIS SUBROUTINE CONVERTS THE KEY NUMBER TO A MOVE
                COMMAND.
10800   *
10900   DECODE  LDA A   MMBR
11000   DECODM  ASL A
11100                BCC     B7
11200                ASR A
11300                ASR A
11400                BCS     B8
11500                ASR A
11600                BCS     B9
11700                LDA A   #$F0            KEY1 PRESSED
11800                BRA     B10
11900   B9      LDA A   #$A0            KEY2 PRESSED
12000                BRA     B10
12100   B8      LDA A   #$E0            KEY3 PRESSED
12200                BRA     B10
12300   B7      ASL A
12400                BCC     B11
12500                ASR A
12600                ASR A
12700                ASR A
12800                BCS     B12
12900                ASR A
13000                BCS     B13
13100                LDA A   #$50            KEY4 PRESSED
13200                BRA     B10
13300   B13     LDA A   #$00            KEY5 PRESSED
13400                BRA     B10
13500   B12     LDA A   #$40            KEY6 PRESSED
13600                BRA     B10
13700   B11     ASR A
13800                ASR A
13900                ASR A
14000                BCS     B14
14100                ASR A
14200                BCS     B15
14300                LDA A   #$D0            KEY7 PRESSED
14400                BRA     B10
14500   B15     LDA A   #$80            KEY8 PRESSED
14600                BRA     B10
14700   B14     LDA A   #$C0            KEY9 PRESSED
14800   B10     STA A   MMBR
14900                RTS
15000   PAGE
15100   **************************************************
15200   *
15300   *
15400   *       TTEN ACCEPTS MULT AND RETURNS MULT*10
```

```
15500         *              10M = (8+2)M
15600   TTEN      LDA A   MULT
15700             ASL A
15800             TAB
15900             ASL A
16000             ASL A
16100             ABA
16200             STA A   MULT
16300             RTS
16400   ************************************************
16500   ************************************************
16600   *    INDEXR COMPUTES AN ABSOLUTE ADDRESS FOR THE INDEX
             REGISTER
16700   *              REGX=TABLE+INDEX
16800   *
16900   INDEXR    CLC
17000             LDA A   INDEX
17100             ADC A   TABPT+1
17200             STA A   MULT
17300             LDA A   TABPT
17400             BCC     B6A
17500             INC A
17600   B6A       STA A   DUM1
17700             LDX     DUM1
17800             RTS
17900      PAGE
18000   *SRINE SUBROUTINE
18100   *----------------
18200   *      THIS PROGRAM GENERATES FOUR 1/3 SECOND PULSES TO
              CONTROL THE SIRNE
18300   *THE PULSE IS HIGH FOR 1/3 SECONDS AND LOW FOR 2/3 SECONDS
18400   *
18500   SRINE     LDA A   #$02         SET LOOP COUNTER
18600             STA A   COUNT
18700   SRINE1    LDA A   PORT3        GENERATE START PULSE TO BLOW SRINE
18800             ORA A   #$40
18900             STA A   PORT3
19000             LDX     #$25         SET WAIT COUNTER
19100             JSR     WAIT         CALL WAIT SUBROUTINE
19200             LDA A   PORT3        GENERATE STOP PULSE TO BLOW SRINE
                                       SET OFFENSE TEAM TO WHITE
19300             AND A   #$9F
19400             STA A   PORT3
19500             LDX     #$200        SET WAIT COUNTER
19600             JSR     WAIT         CALL WAIT
19700             DEC     COUNT        TEST FOR FINISHED LOOP
19800             BNE     SRINE1
19900             RTS                  RETURN
20000      PAGE
20100   *WAIT SUBROUTINE
20200   *---------------
20300   *      THIS PROGRAM IS A WAIT LOOP TO USE UP TIME
20400   *THE LENGTH OF TIME IS CONTROLLED BY THE VALUE OF THE X
             REGISTER
20500   *
20600   WAIT      CLR B                CLEAR THE B REGISTER
20700   WAITX     DEC B                DECREMENT
20800             BNE     WAITX        TEST FOR FINISHED
20900             DEX                  DECREMENT X
21000             BNE     WAITX        TEST FOR FINISHED
21100             RTS                  RETURN
```

PROGRAM LISTING
APPENDIX D

```
00100      *
00200      *VARIABLE TABLE
00300      *--------------
00400      *
00500      PLAYER   RMB 1         PLAYER NUMBER 0-4 OR 8-C
00600      DOWN     RMB 1         DOWN COUNT 1-4
00700      TOTAL    RMB 1         TOTAL YARDS GAINED MAX=100
00800      YTOGO    RMB 1         YARDS TO GO FOR A FIRST DONW
00900      DISTOT   RMB 1         CONTAINS YARD LINE MARKER NUMBER
                    MSB=1 DISPLAY BLACK   MSB=0  DISPLAY WHITE
01000      LOOP     RMB 1         COUNTER USED IN COUNTING LOOPS
01100      COUNT    RMB 1         COUNTER USED IN COUNTING LOOPS
01200      TIME     RMB 1         USED TO CONTROL THE LENGTH OF THE
                                  OUTPUT MOVE PULSE
01300      TEMP1    RMB 1         USED FOR TEMPOARY STORAGE
01400      TEMP2    RMB 1         USED FOR TEMPORARY STORAGE
01500      TEMP3    RMB 1         UESD FOR TEMPORARY STORAGE
01600      TEMP4    RMB 1         USED FOR TEMPORARY STORAGE
01700      FLAG2L   RMB 1         OFFENSE KEYBOARD DONE FLAG
                                  80=DONE
01800      FLAG2R   RMB 1         DEFENSE KEYBOARD DONE FLAG
                                  80=DONE
01900      TACKLE   RMB 1         TACKLE FLAG END OF PLAY
02000      PASSFG   RMB 1         PASS FLAG PASS IN PROGRESS
02100      INCPAS   RMB 1         INCOMPLETE PASS FLAG
02200      COMPAS   RMB 1         COMPLETE PASS FLAG
02300      INTPAS   RMB 1         INTERCEPTED PASS FLAG
02400      BALCY    RMB 1         BALL CARRIER NUMBER STORAGE
02500      POSITN   RMB 1         BALL CARRIER POSITION STORAGE
                                  LOCATION
02600      VALIDL   RMB 1         INPUT DATA FROM LEFT KEYBOARD
                                  OFFENSE
02700      PASSCT   RMB 1         PASS COUNTER TIMER FOR INCOMPLETE
                                  FLAG
02800      COINUM   RMB 1         COINICIDENCE SELECT NUMBER
02900      BALMOV   RMB 1         BALL MOVE COMMAND
03000      CRNTL    RMB 1         CURRENT KEY CODE LEFT STORAGE
03100      CRNTR    RMB 1         CURRENT KEY CODE RIGHT STORAGE
03200      OLDL     RMB 1         OLD KEY CODE LEFT STORAGE
03300      OLDR     RMB 1         OLD KEY CODE RIGHT STORAGE
03400      VALIDR   RMB 1         VALID KEYBOARD INPUT RIGHT
03500      COUNTL   RMB 1         NUMBER OF SAME KEY SCANS LEFT
03600      COUNTR   RMB 1         NUMBER OF SAME KEY SCANS RIGHT
03700      FLAG1L   RMB 1         KEY DEPRESSED DURRING LEFT SCAN
                                  FLAG
03800      FLAG1R   RMB 1         KEY DEPRESSED DURRING RIGHT SCAN
                                  FLAG
03900      STROBE   RMB 1         KEYBOARD STRIBE STORAGE
04000      STRBO    RMB 1
04100      PNUML    RMB 1         PLAYER NUMBER TO BE PROGRAMMED LEFT
04200      PNUMR    RMB 1         PLAYER NUMBER TO BE PROGRAMMED
                                  RIGHT
04300      CMNDL    RMB 1         MOVE NUMBER TO BE PROGRAMMED LEFT
04400      CMNDR    RMB 1         MOVE NUMBER TO BE PROGRAMMED RIGHT
04500      BLINKL   RMB 1         COUNTS SCANS BLINK PLAYER IS
                                  ENABLED LEFT
```

```
04600      BLINKR    RMB  1            COUNTS SCANS BLINK PLAYER IS
                                       ENABLED RIGHT

04700      DUM1      RMB  1
04800      MULT      RMB  1
04900      MMBR      RMB  1            TABLE MEMBER
05000      SIDE      RMB  1            0=LEFT SIDE IS OFFENCE  1=RIGHT
                                       SIDE IS OFFENSE
05100      INDEX     RMB  1
05200      TABPT     FDB  TABLE        TABLE POINTER
05300      POINTR    FDB  POS          POINTS TO MOVE TABLE OR POSITION
                                       TABLE
05400      POS       FCB  $56          LEFT TEAM POSITION IN LINE-UP
05500                FCB  $77
05600                FCB  $96
05700                FCB  $76
05800                FCB  $75
05900                FCB  $4B          RIGHT TEAM POSITION IN LINE-UP
06000                FCB  $78
06100                FCB  $AB
06200                FCB  $79
06300                FCB  $7C
06400                FCB  $76          BALL LINE UP POSITION
06500      TABLE     RMB  50           MOVE TABLE DATA
06600                END
06700                MON
```

We claim:

1. In a digital processor controlled interactive game system having means for generating and displaying one or more game symbols on a two dimensional graphic display, apparatus for determining the motion of the symbols on the display, comprising:
   a processor;
   an input device coupled to said processor, said input device including at least one physical actuable element for defining at least one game path segment from a number of different game path segments by manually preselecting a plurality of individual, successive, incremental directional movements of a symbol prior to execution of any of such movements, said element determining at least one specific motion command for the symbol; and
   means for executing a selected plurality of successive, incremental directional movements of a symbol after preselection thereof.

2. Apparatus as defined in claim 1, further including a plurality of said physically actuable elements wherein each element determines a different motion command.

3. Apparatus as defined in claim 2, wherein said physically actuable elements are switches.

4. Apparatus as defined in claim 3, wherein said input device includes a plurality of keys for actuating said switches.

5. Apparatus as defined in claim 4, wherein each of said keys includes indicia thereon indicating various successive, directional movement.

6. Apparatus as defined in claim 1, said input device further including means for superimposing during game play additional directional movement commands for the symbol on those of the preselected motion commands.

7. Apparatus as defined in claim 6, said system including a symbol generator, wherein said superimposing means include at least one potentiometer coupled to a symbol generator.

8. In a digital processor controlled interactive game system having means for generating and displaying a plurality of game symbols representing at least two opponents on a two dimensional graphic display, apparatus for independently preselecting the successive directional movement of the symbols on the display, comprising:
   a processor;
   a first input device coupled to said processor, said first input device including at least one physcally actuable element for defining at least one game path segment from a number of different possible game path segments by manually programming a plurality of individual, successive incremental directional movements prior to execution of such movements of at least one symbol representing one of the two opponents, said element determining at least one successive directional movement command for the symbol such that successive motion steps for the symbol can be selected prior to execution of the movements; and
   a second input device coupled to said processor; said second input device including at least one physically actuable element for defining at least one game path segment from a number of different possible game path segments by manually programming a plurality of individual, successive incremental directional movements prior to execution of such movements of at least one symbol representing the second of the two opponents said element determining at least one successive directional movement command for the symbol such that successive directional movement steps for the symbol can be selected prior to execution of the movements.

9. A method for determining the motion of game symbols in a digital processor controlled interactive game system having means for generating and displaying one or more game symbols on a two dimensional graphic display, comprising the steps of:

generating signals representing at least one game symbol for display on a graphic display;

displaying said symbol;

manually preselecting a plurality of individual, successive, incremental directional movements for the symbol prior to execution of any of such movements on the display by manually operating at least one physically actuable element with defines at least one game path segment from a number of different possible game path segments; and causing the symbol to move on the display in accordance with the preselected movements defining said at least one game path segment.

* * * * *